United States Patent
Roushar

(10) Patent No.: US 7,403,890 B2
(45) Date of Patent: Jul. 22, 2008

(54) MULTI-DIMENSIONAL METHOD AND APPARATUS FOR AUTOMATED LANGUAGE INTERPRETATION

(76) Inventor: Joseph C. Roushar, 4741 NW 147th La., Anodover, MN (US) 55304

( * ) Notice: Subject to any disclaimer, the term of this patent is extended or adjusted under 35 U.S.C. 154(b) by 896 days.

(21) Appl. No.: 10/144,739

(22) Filed: May 13, 2002

(65) Prior Publication Data

US 2003/0216919 A1    Nov. 20, 2003

(51) Int. Cl.
G06F 17/20  (2006.01)
G06F 17/30  (2006.01)

(52) U.S. Cl. ............... 704/9; 704/10; 706/55; 707/3

(58) Field of Classification Search ........ 704/1, 704/9, 10, 270; 707/1, 2, 3, 100, 101, 104.1; 706/55, 56, 45
See application file for complete search history.

(56) References Cited

U.S. PATENT DOCUMENTS

| | | | | |
|---|---|---|---|---|
| 4,849,898 A * | 7/1989 | Adi | ............... | 707/5 |
| 4,914,590 A * | 4/1990 | Loatman et al. | ............... | 704/8 |
| 5,715,468 A * | 2/1998 | Budzinski | ............... | 704/9 |
| 6,076,088 A * | 6/2000 | Paik et al. | ............... | 707/5 |
| 6,199,034 B1 * | 3/2001 | Wical | ............... | 704/9 |
| 6,675,159 B1 * | 1/2004 | Lin et al. | ............... | 707/3 |
| 6,694,328 B1 * | 2/2004 | Bennett | ............... | 707/103 R |
| 6,725,209 B1 * | 4/2004 | Iliff | ............... | 706/45 |
| 6,834,280 B2 * | 12/2004 | Auspitz et al. | ............... | 707/3 |
| 6,901,399 B1 * | 5/2005 | Corston et al. | ............... | 707/6 |
| 6,907,417 B2 * | 6/2005 | Alpert | ............... | 706/55 |
| 7,107,253 B1 * | 9/2006 | Sumner et al. | ............... | 706/45 |

FOREIGN PATENT DOCUMENTS

WO    WO 01/10985 A2    7/2002

OTHER PUBLICATIONS

John Sowa: "Semantic Networks", Aug. 31, 2001, URL: http://www/web.archive.org/web/20020203105038/http://www.jfsowa.com/pubs/semnet.htm.

Sanda Harabagiu, Dan Moldovan: Enriching the WordNet Taxonomy with Contextual Knowledge Acquired from Text, 2000, AAAI/MIT Press, Natural Language Processing and Knowledge Representation: Language for Knowledge and Knowledge for Language, XP002433321.

Janyce Wiebe, Tom O'Hara, Rebecca Bruce: "Constructing Bayesian Networks from WordNet for Word-Sense Disambiguation: Representational and Processing Issues", 1998, Association for Computational Linguistics, Proceedings of Coling-Acl '98 Workshop on the Usage of WordNet in Natural Language Processing Systems, Montreal, Canada, XP002433322.

* cited by examiner

*Primary Examiner*—Martin Lerner

(57) ABSTRACT

A method and apparatus for natural language interpretation are described. The invention includes a schema and apparatus for storing, in digital, analog, or other machine-readable format, a network of propositions formed of a plurality of text and/or non-text objects, and the steps of retrieving a string of input text, and locating all associated propositions in the network for each word in the input string. Embodiments of the invention also include optimization steps for locating said propositions, and specialized structures for storing them in a ready access storage area simulating human short-term memory. The schema and steps may also include structures and processes for obtaining and adjusting the weights of said propositions to determine posterior probabilities representing the intended meaning. Embodiments of the invention also include an apparatus designed to apply an automated interpretation algorithm to automated voice response systems and portable knowledge appliance devices.

1 Claim, 20 Drawing Sheets

| Object | Content | Object | Content |
|---|---|---|---|
| x | Any known object | c | Any known context |
| y | Any other known object | q | Any known qualifier |
| r | Any known relation | w | A weight within range |

MULTI-DIMENSIONAL METHOD AND APPARATUS FOR AUTOMATED LANGUAGE INTERPRETATION

BACKGROUND OF THE INVENTION

1. Field of the Invention

The present invention relates generally to natural language understanding and more specifically to knowledge-based methods for determining which of all possible meanings is intended by the speaker or writer of any portion of text in English or another natural language. As both words and phrases can often have multiple meanings, the problem is significant and many prior approaches have failed to yield satisfactory results. In order to achieve a high level of accuracy in natural language meaning interpretation, a knowledge base of information similar in breadth and depth to the knowledge of a human being is needed. Using digital or other automated strategies to represent and process this quantity of knowledge must be highly optimized to achieve satisfactory performance.

2. Description of Related Art

Under the general field of automated data processing, natural language processing falls under the specific category of artificial intelligence or, more recently, knowledge-based systems. Over the course of time, many of the trends and new developments in artificial intelligence have lead to new approaches for natural language processing. One such trend is "rules-based" systems applying production rules to perform forward-chaining or backward-chaining inference. The typical failing of these systems has been that the number of rules required to express the complexity of language has been extremely high and the sequential processing of these rules has lead to unacceptably long processing times.

An earlier trend involved list-based approaches using the LISP programming language. LISP provides an elegant computational mechanism of lists for processing many rules as constraints for interpreting text. Unfortunately, as the lists proliferate, list management becomes impractical and correlation of related constraints in different lists or even at opposite ends of the same list consumed too much computational effort and took too long. Those efforts were followed by logic-based approaches using the PROLOG programming language. This was a special syntax or structure for production rule type systems as described above and performance problems made these approaches equally impractical.

Some developers have used neural network approaches with connectionist and other neural networks to attempt to understand language. The model is appealing because the formulas, algorithms, and structures seem to mimic the brain. Neural networks have proven very good for two-dimensional and some three-dimensional problems such as automated character recognition and voice recognition. Neural networks appear to be good representations of the parts of the brain responsible for these tasks with limited dimensionality. Unfortunately, they require an inordinate amount of training time to "learn" about each new object. Furthermore, language understanding involves multiple dimensions, and the parts of the brain responsible for these functions appear to have more complex structures and processes. Therefore, a new approach is needed.

Most language analysis approaches, including those described above, have used different parsing techniques where the sentence is scanned from left to right, or right to left, and the syntactic structure determined based on patterns or rules. Newer approaches have added semantic constraint resolution to the syntactic analysis to improve the accuracy and usefulness of the results. These have introduced incremental advances in capabilities, but without the full analysis of context, they have not significantly increased the accuracy of language interpretation. Syntax is an important dimension of language understanding, and adding the dimension of semantics is important. But without the dimension of context, the accuracy will never approach human competency in language comprehension.

There have been various approaches that use genetic or evolutionary algorithms, semantic networks, conceptual schema and, most recently, Bayesian networks that seek to add the dimension of context. Though these approaches hold the promise of much higher accuracy, the proliferation of nodes in the semantic and Bayesian networks have made it impossible to achieve sufficient speeds to process language without unacceptable delays. Specifically, as these networks increase in size beyond dozens or hundreds of nodes, the processing times required to perform language analysis increases exponentially. When they attempt to include syntactic, semantic, and contextual information in these networks, the combinatorial explosion of processing time renders these systems useless.

3. Definitions of Terms

Activation

The spread of positive and negative electrical potential in the brain from neuron to neuron is called activation. Positive activation is called excitation and negative activation is called inhibition. In the multi-dimensional interpreter's knowledge network activation spreads from node to node based on associative links. This activation is a means of stochastic or fuzzy recognition used in the genetic selection algorithm.

Activation Wave

This expression represents the serial flow of excitation and/or inhibition triggered by a single input in a natural or artificial neural network. Natural and artificial neural networks can exhibit directional or chaotic flow of activation. An example of directional activation flow in a natural system is the human visual cortex which has multiple layers and through which activation flows sequentially from the back to the front, then on into the correlation and interpretation centers of the brain. Consequently, the deconstruction of the image in the brain's visual center is an output of a relatively directional wave of activation flow.

Once in the correlation and interpretation centers, the flow becomes much less directional or more chaotic. Activation flows in parallel to many specialized areas of the brain. These processing centers respond by sending back activation patterns that contribute to the emergent phenomena of recognition and interpretation that go on to support all cognitive functions. Whether directional or not, the path of any activation flow in a neural system can be traced backward from the point (neuron or node) where the flow stops to the point where it began, no matter how much it spreads or branches out in the process. The collection of all such serial paths triggered by a single input constitutes what we call a wave.

The complexity of the input may be arbitrary, but the more complex the input, the more complex the wave will be, hence the more difficult to trace. The science of tracing activation waves in the brain is not yet mature enough to trace the entire path of activation flow either backward or forward from neuron to neuron for a given input. Artificial systems, however, can be traced. Mimicking human activation flow patterns is one of the key objectives of many artificial neural systems.

Consciousness

In humans, consciousness is an emergent cognitive phenomenon usually active whenever one or more of the senses is perceptually active. Other cognitive phenomena, such as attention, derive from consciousness and may be described as "heightened states of consciousness". In the multi-dimensional interpreter, consciousness is a state of accepting and processing input while maintaining a broader map of the spatial, temporal, commercial, and social context associated with its primary user.

Context

Context is a snapshot of the universe from a specific point of view to a specific depth. If the viewpoint is that of an astronomer at work, it could begin at her desk and include a radius of many thousands of light years. If the viewpoint is that of an electron in an inert substance, the context would encompass a very small distance. Context includes locations in space, points in time, activities, ideas, intentions, communications, motion, change, stasis, and any describable thing associated with the person, place, or thing to which the context applies.

Counterfactual

A counterfactual is a proposition that states that a certain associative proposition or causal link is unlikely, thus it spreads negative or inhibitory activation.

Disambiguation

Disambiguation is the process of resolving ambiguity, especially in words, symbols, or phrases that carry multiple possible meanings (polysemy). This is necessary for accurate interpretation of input human language text or utterances. Context is needed to disambiguate polysemous input.

Doping

In a genetic algorithm, doping is the process of introducing random or quasi-random variables into the equation, population or gene pool to affect the process, the output, or both. In this context quasi-random may mean; based on a random number generator, based on random selection of targets to which to apply variables, or based on non-random variables applied in a non-random way, but in which the variables have no describable association with the core interpretive processes or the targets to which the variables are applied.

Emergence

The term "emergent behavior" has been applied to the human brain and other complex systems whose internal behavior involves non-deterministic functionality or is so complex, or involves the interaction of so many pieces, that tracing the process from beginning to end is not possible or not feasible. Because of the power of computers and their ability to track internal activity, it is not possible to produce 100% untraceable processes just as it is not possible to produce a random number generator that is actually random and not ostensibly random. Information is said to "emerge" because it cannot be traced back to its source. In the context of the multi-dimensional interpreter, emergence is a computational behavior that mimics the inventor's understanding of the behavior of the human brain processes used to interpret human language.

Encoding Scheme

A way of representing something using a tightly specified symbol or object set. ASCII and EBCDIC are encoding schemes for symbol systems for alphabetic and numeric symbols. In this document, encoding scheme refers to a specific design for structuring language knowledge facts and real-world knowledge facts in the form of words and other human and machine readable symbols into conceptually relevant associations that can support automated or computerized access and processing. Human languages are such encoding schemes, but their irregularities make it difficult for use in their normal form for automated processing. Well-formed syllogisms or other logical statements with a finite set of connectors and operators are a more regular encoding scheme for knowledge of facts.

Expectation

Expectation is a concept that is relatively foreign to computing but essential to achieving high accuracy in natural language interpretation. Expectation is an a-priori set of contextual markers that describe a world familiar to the multi-dimensional interpreter system based on the world familiar to the human user. The more the system knows about the primary users and their surroundings, the better it will be able to determine the users' intentions based on the words they submit to the system.

Fitness

Fitness is a characteristic of a candidate solution or a part thereof. In a genetic selection process, survival-of-the-fittest is used to differentiate possible solutions and enable the one or more fittest solutions to emerge victorious.

Genetic Selection

Genetic Selection is a process of survival-of-the-fittest in which fitness algorithms are applied to multiple possible solutions and only the best survive each generation. Unlike winner-take-all processes in which only the single best candidate solution emerges, genetic selection can yield multiple surviving solutions in each generation. Then, as successive generations are processed, survivors from previous generations may die off if the succeeding generations are more fit.

Inference

For the purpose of this invention inference involves correlating multiple constraints contained in input and derived from other sources, and drawing conclusions based on testing the relative truth of multiple propositions affecting each constraint. Inference is what humans constantly do with our brains. Based on perceptions, humans make inferences about meaning, about the state of things, about consequences of actions, and about life, the universe, and everything. Inference involves applying logic to new information derived from our senses and remembered information stored somehow in the brain to form conclusions. Forming conclusions is important because the conclusions form a basis for correct interpretation and appropriate further processing. A characteristic of the conclusions drawn by the multi-dimensional interpreter is that it can abandon one quickly if newer information prompts it to do so.

Knowledge

For the purpose of this invention, the term knowledge means correlated information. This definition is part of a larger continuum in which everything interpretable can be assigned to some point on the continuum. The position of knowledge in this continuum can be described in terms of its complexity relative to other things in the environment that are interpretable. The level of facts that we can learn and describe in simple phrases is called existential knowledge or data. Data is the kind of knowledge expressed in almanacs. At the complex end of the knowledge continuum is one or more levels of meta-knowledge or knowledge about knowledge.

The term "noise" is borrowed from radio wave theory to describe interpretable things that interfere with the interpretation of or acquisition of knowledge. Noise, the simplest of all interpretable things, is made up of things in the perceptual environment or input that are less meaningful than data. An interpretation system must be able to process noise because it is omnipresent. Thus, a system must have knowledge that enables it to sort out the noise from the salient data, though this may be more of an attention function than actual knowledge. Once the noise in the environment is filtered out, all that remains is data, which can be correlated to constitute knowledge.

Data elements that humans process are input in the form of perceptual stimuli to the five senses. The specific types of data available are tactile sensations, tastes, smells, sounds and images. These perceptual inputs are processed in specialized areas of the brain, correlated in parallel, then used as the basis for cognitive processing. The multi-dimensional interpreter algorithms are primarily designed to interpret human language, but are also able to be generalized to interpret the other forms of sensory input described above.

Knowledge Base

The multi-dimensional interpreter uses a knowledge base that contains the basic information about things in the world and the way they are interrelated.

Knowledge Network

A massively interconnected network of information about how linguistic and real-world objects relate to one another.

Lexicon

Lexicon is a list of words, letters, numbers, and/or phrases used in a natural language, such as English, that express meaning or facts or represent objects or phenomena. The lexicon consists of a list of lexical items or objects, each a word or symbol or combination thereof. In the multi-dimensional interpreter the lexicon is part of the Knowledge Base.

Multi-Dimensional Processing

In this document, multi-dimensional processing refers to an approach of using an automated device or computer to analyze a string of input data, such as a sentence in English, from more than one perspective. Perspectives or dimensions include, for example, grammar or syntax, semantics, pragmatics, context, and morphology.

Mutation

A genetic algorithm mutation is a process of altering the characteristics of a candidate solution or a part thereof during the course of processing. The mutated result then can compete with other results for fitness as a solution.

Natural Language Processing

Natural language processing means using computers to analyze natural language input, such as English sentences, for the purpose of interpretation, paraphrasing, or translation.

Neural

Of, resembling, or having to do with the processing components and functions of the brain and/or its cells. Perceptual, inquisitive, communicative, interpretive, creative, and decisive cognitive processes occur in the brain through the functioning of its network of neuron cells. Those processes are neural, and automated processes designed to resemble the structure and/or functions of these processes are often characterized as neural.

Object

An object is a discreet string of one or more symbols or characters that has a beginning and an end and an unchanging content. If the content were to change through the addition, subtraction, or modification of one or more of its characters, it would become a different object.

Object Base

A set of lists of objects in which each list contains a collection of like objects. One such list is the lexicon whose constituent objects are all lexical items. Another such list is the sound base, which contains a list of sounds as machine-readable representations such as .wav files. The object base may also contain an image base holding a collection of images such as .gif and .jpeg files. Other lists, such as video, aroma, and tactile object lists can also be stored as object bases. The object bases are part of the knowledge base.

Polysemy

The linguistic phenomenon of multiple meanings applying to a single word, symbol, or phrase.

Real-World Knowledge

Real world knowledge includes facts about phenomena and things. In this document, real-world knowledge refers to information or data associated with other information or data in a meaningful or expressive way to represent facts in the world. Some facts describe the hierarchical relations between classes and subclasses of objects in the real world such as "a dog is Canine in the animal kingdom". Other facts describe causal relations such as "gravity pulls physical objects toward each other", and yet others describe constructive relations such as "a knob is part of a door".

Stochastic

Non-deterministic or "fuzzy" processing techniques and encoding approaches that deliver output from a process that is virtually impossible to determine based on the inputs because of the sheer number of permutations and/or the complexity of the weighting mechanisms and processes to adjust weights during the course of the process and prior to the output.

SUMMARY OF THE INVENTION

The theory underlying the invention disclosed herein comes from several academic disciplines whose collective work was required to solve problems plaguing all who have sought and are seeking to automate language understanding. Those disciplines include:

1) Neuroanatomy/Physiology
2) Linguistics
3) Philosophy
4) Anthropology
5) Psychology/Learning Theory
6) Computer Science/Artificial Intelligence When humans communicate by speaking or writing, they assume that they do not have to begin by sharing all their knowledge about the world so that the recipients can understand what they are saying, but they do assume that the recipients share a huge body of knowledge about the world. In fact, communications are often tailored to address the recipients' expected or perceived knowledge level. In order for a computational system to approximate adult human performance, the system must begin with a corresponding body or world knowledge.

The lexicon and molecules in the knowledge network are dynamic building blocks of successful interpretation. They are dynamic because new lexical entries can be added, new propositions can be added and confidence values of propositions can be changed. The primary processes of interpretation are based on comparing input with this network of propositions, determining the likelihood that specific propositions apply and are true, then delivering the set of the most applicable and likely propositions as the solution or interpretation.

To manage the combinatorial explosion of possibilities, the multi-dimensional interpreter makes no attempt to describe any of the possible interpretations of a sentence or utterance in the knowledge base, but describes components of solutions associated with words and phrases. This mirrors the way people assemble words and phrases to communicate intent. The knowledge base, therefore, attempts to describe each possible solution of each object that is a component of any possible input text or utterance. This approach assumes that most presented inputs will have a sufficient mass of solvable or interpretable components, and that the aggregation of the solved components will be sufficient to describe an acceptable interpretation of the input. It also assumes that the more accurately and dependably the system can resolve the individual objects as components, the more accurate the final interpretation will be.

The problem of polysemy applies to words, phrases and sentences with multiple meanings. Learning and delivering individual solutions to polysemy at the lexical word and phrase levels makes the multi-dimensional interpreter better able to solve aggregate problems of phrase and sentence ambiguity, therefore increasing the accuracy of interpretation. Humans resolve ambiguity using knowledge about the real world. Without the context of the real-world knowledge, the problem of polysemy is too difficult to solve.

The multi-dimensional interpreter requires a massive amount of information about the physical and abstract things in the real world as well as information about linguistic patterns and structures and their interrelationships. The atomic or basic components of this information are encoded in an object base with a lexicon holding lexical entries or objects. These objects can be letters, words, numbers and characters that are not alpha-numeric, but are used commonly in communication. The knowledge network associates these lexical objects with one another in contextually specific logical propositions resembling molecules.

The underlying theory behind the reliance on a lexicon to represent the basic elements or atoms of knowledge is that all human knowledge is represented by words and phrases, and if we cannot describe it using a word or a phrase, we do not know it. As humankind learns and develops new knowledge, new words and phrases are coined. The multi-dimensional interpreter is able to add new words, phrases and other objects to the lexicon to represent knowledge that is new to the system or new to humankind. The knowledge base also contains object bases of non-lexical items such as sounds and images to broaden interpretation capabilities.

To build smart processes, knowledge must be stored intelligently and efficiently. The multi-dimensional interpreter stores the interrelationship information in a massive network of symbolic propositions associated by explicit links. This network is analogous to long-term memory (LTM) in humans. In order to get at this knowledge, the lexicon is used to provide direct access to each proposition in the network associated with that lexical entry or object. Non-lexical objects can also be used to access the knowledge network. This direct access is analogous to a content-addressable mechanism for reading information in long-term memory.

Because of the massive size of the knowledge network and the fact that only small portion of that knowledge will be needed to interpret any given sentence or paragraph, the salient information discovered through searching the knowledge network is moved into a temporary processing area that is preferably optimized short-term memory (STM). While knowledge or information in long-term memory is persistent, the contents of short-term memory are frequently changed and modified during the course of processing.

This invention includes a symbolic processing model representing human short-term memory and a specialized part of the brain called the hippocampus. Evidence suggests that the hippocampus provides a cognitive map of the environment in which a human being is at, at any given time. For animals, whose olfactory sense is critical to survival, the hippocampus appears to play a role in mapping the immediate spatial environment (where one is at a given time).

This type of cognitive map may be primarily visual. On the other hand, the dominant senses in animal behavior are those used for survival: sight, sound, and smell. Coordination of a spatial template of the food-gathering environment and an olfactory path to the location of the food would provide animals with a good survival mechanism.

To interpret complex inputs from multiple senses, we need some kind of context to act as a framework for understanding. This notion treats the perceiver as the central point in the context of what is being perceived. In some ways, this is analogous to treating the brain as a central component of a larger process in which the flow of chemicals and fluids and electricity are not segregated in a closed system but are part of a much larger network of cooperating subsystems.

Furthermore, although the function of the hippocampus is not fully understood, likely role of the hippocampus in cognition is to serve as a contextual map of the environment. for instance, when a person is in a familiar place, such as a kitchen or living room, certain sounds will cue attention. The same sounds in a factory, hospital, automobile, or coal mine could well be ignored or not even registered. The environmental map makes possible such feats as disarming the alarm clock without totally waking up or navigating through the house without turning on the lights. Because of the pivotal role apparently played by the hippocampus in cognition, some artificial neural networks describe a correlating layer as the hippocampus. This is a reasonable approach because cognition, recognition, and comprehension are thought to require more than a reaction in the area of the brain that receives and processes the input.

This invention introduces a new strategy for representing knowledge in an arbitrarily large network of compact propositions. It further introduces an efficient mechanism for extracting salient propositions, organizing them by context in multi-dimensional structures that are functionally similar to human short-term memory, and processing them using methods resembling the chaotic flow of electrical potentials in the human brain. The present invention describes applications using the knowledge network and language processing methods to interpret the meaning of input text, then performs actions such as engaging in natural language dialog to assist users, and/or translating the input text into other natural languages.

The massive knowledge network is similar to a Bayesian network in that weights attached to each proposition serve as a-priori probabilities. The method, however, extracts these weighted propositions from the knowledge network, and groups them by context in multi-dimensional structures simulating human short-term memory. There they are exposed to processes that simulate the flow of positive (excitatory) and negative (inhibitory) potentials that modify their weights causing some to increase and others to remain unchanged or decrease.

This invention does not parse sentences, but uses hybrid techniques that resemble neural network processes, for example, Bayesian network structures, employing genetic or evolutionary algorithm methods to permit the invention to derive more than one "surviving" gene or solution. Most parsers only use information about all the possible syntactic roles that apply to any given word. This invention preferably uses all the syntactic, semantic, and real-world knowledge that applies to any given object as the basis for correctly determining the meaning of each object in a sentence or ordered sequence of written or spoken human language.

While using the neural network strategies of simulating the flow of electrical potentials in the brain and learning through back propagation, this invention overcomes several weaknesses of most existing neural networks. First, training is more straightforward and less redundant. Second, the input and output can be arbitrarily complex without sacrificing accuracy while most existing neural networks are generally limited to two or three-dimensional problems. This limitation arises from the widely accepted model of storing no explicit values of knowledge, but implicitly representing the learned information in the overall weighting between the complex, but individually meaningless aggregation of simple, ordered nodes in a neural network. In addition, the directional flow of potentials in most existing neural networks limits their ability to simulate human cognitive activity.

This invention overcomes the implicit knowledge weakness by using network nodes with explicit values that are complex propositions describing real-world knowledge. Learning occurs by adding and correcting propositions. Like connectionist neural networks, this invention uses brain-like processes simulating the flow of excitatory and inhibitory electrical potentials to cause correct propositions regarding meaning to "heat up" or emerge. Thus, the multi-dimensional model consists of complex nodes containing explicit information in a non-directional, non-ordered, or chaotic network structure. One advance of this invention is the ability to access salient information among hundreds of thousands to millions of explicit nodes in the multi-dimensional network.

The explicit information in the multi-dimensional network also overcomes the training weakness of most existing neural networks. The multi-dimensional network training process involves adding new information to the knowledge network and changing knowledge in the knowledge network by adjusting weights of vectors of specifically targeted propositions. New information is added in the forms of new lexical and non-lexical object entries, new propositions comprised of a plurality of objects, and new associations between objects and/or propositions. Furthermore, this invention may be utilized to store and differentiate general knowledge useful for a broad range of applications and users, from domain specific and user specific knowledge.

Because the propositions are composed primarily of words in human languages such as English, the propositions are readable by people who have no special training. Consequently, anyone who speaks the language can "teach" the interpreter about facts in the real world. Adding knowledge to the network expands the ability of the interpreter to recognize and interpret objects and propositions. Knowledge that is already in the network is changed by adjusting the weight associated with a proposition. The aggregation of such changes creates measurable aggregate changes in the behavior of the system enabling it to increase accuracy of interpretation. Though some of the embodiments herein refer specifically to treatment of the English language, any specific embodiment of the unique methods or apparatus of the present invention may be applied to all human languages because the differences between languages require no adjustment to the algorithms or schema, but only to the data objects stored within the same schema.

This invention overcomes a weakness of Bayesian networks in that the greater the number of nodes and connections in a Bayesian network, the poorer the performance. Like neural networks, most Bayesian networks require a process of analyzing all the nodes in sequence from one side to the other. Most of nodes may be irrelevant and useless in the determination of the solution, but they are processed every time regardless. This invention, by gaining direct access to the salient nodes (propositions) in the network through the object base, and placing these nodes in different structures in memory, enables very rapid processing of complex probabilities. It, in effect, uses the input words as a basis for finding those nodes in the network that are most likely to impact the solution and ignores all other nodes in the network.

Comparing and mutually reinforcing the probabilities of the applicability of the propositions leads to an emergent phenomenon of understanding the correct meaning or meanings for each object in a sentence or sequence, thus making it possible to interpret the sentence or sequence with human-like accuracy. To increase efficiency further, this invention includes embodiments in which the propositions are encoded or compressed into forms that are not human-readable.

Additionally, this invention defines a slightly more complex, but highly efficient schema for storing real-world knowledge in a Bayesian style network. This schema optimizes the semantic expressiveness present in the objects. Because this knowledge representation scheme is constituted of a massive collection of compact statements of propositional logic, the metaphor of atoms and molecules is a useful theoretical model. The schema is defined as a network of linked molecules, each molecule comprising a plurality of objects or "atoms" with defined functions or meanings. These atoms are typically words in a lexicon, but can also be non-lexical objects such as graphic, sound, or video files. For convenience, letters are assigned to each atomic object such that the head object is assigned the letter "x" and the associated object the letter "y". Complexity may arise from the use of a variety of explicit relation object ("r") terms, the presence of an object that represents the context object ("c"), and/or a qualifier object ("q") that constrains the proposition and permits the existence of contradictory propositions for the same object in different contexts.

There are generally two aspects of genetic or evolutionary algorithms the interpreter uses. First, genetic algorithms use doping procedures that introduce random variables into formulas to simulate genetic mutation. The interpreter introduces quasi-random variables into the flow of potentials in the process to disrupt and focus the progress of emergence. Second, the genetic algorithm construct that permits more than one gene or solution to "survive" may be used by the invention to determine if there are more than one intended or inferable meanings in the input text.

Although currently available hardware may be used for processing the algorithms and the structure of propositions in the knowledge representation schema, embodiments of this invention also include hardware apparatus optimally designed to support these structures and processes.

Hardware optimizations embodied in this invention include devices that can physically attach to automated devices. These devices include:

A multi-dimensional interpreter server that can attach to a general purpose computer through an expansion adaptor such as a passive backplane and provide server-attached interpretation and translation services. This device may utilize proprietary and/or open standard interfaces to make interpretation services available to operating systems, applications and other services attached to the same network or server. For example, an embodiment of the open standard implementation uses Simple Object Access Protocol (SOAP), a currently available Application Programming Interface (API) as a basis for inter-process communication between operating systems, applications and other services and the multi-dimensional interpreter device. For example, SOAP could be used to attach this device to a voice response system of an automated call center attendant or directly to a phone switch to provide real-time interpretation and/or translation services.

A multi-dimensional interpreter expansion card that can attach to a computer bus and provide interpretation and translation services. An embodiment of the expansion card implementation uses a PCI Bus, a currently available expansion slot common to desktop computers. Another embodiment provides computational services to devices attached to a network using a passive backplane common to currently available server and telecommunications applications.

A knowledge appliance with a human language interface that serves as a portable, handheld, or wearable computing device using spoken language as the primary input mechanism.

An intelligent, wired telecommunication device capable of listening to and translating voice messages, such as messages recorded by a telephone answering system. Such a system may be tailored for consumers and/or serve as a universal messaging system for commercial and/or corporate applications.

An intelligent, wireless telecommunication device capable of listening to and translating voice messages, such as messages recorded by a telephone answering system. Such a system may be tailored for consumers and/or serve as a universal messaging system for commercial and/or corporate applications.

DESCRIPTION OF THE PREFERRED EMBODIMENTS

Figure 12:
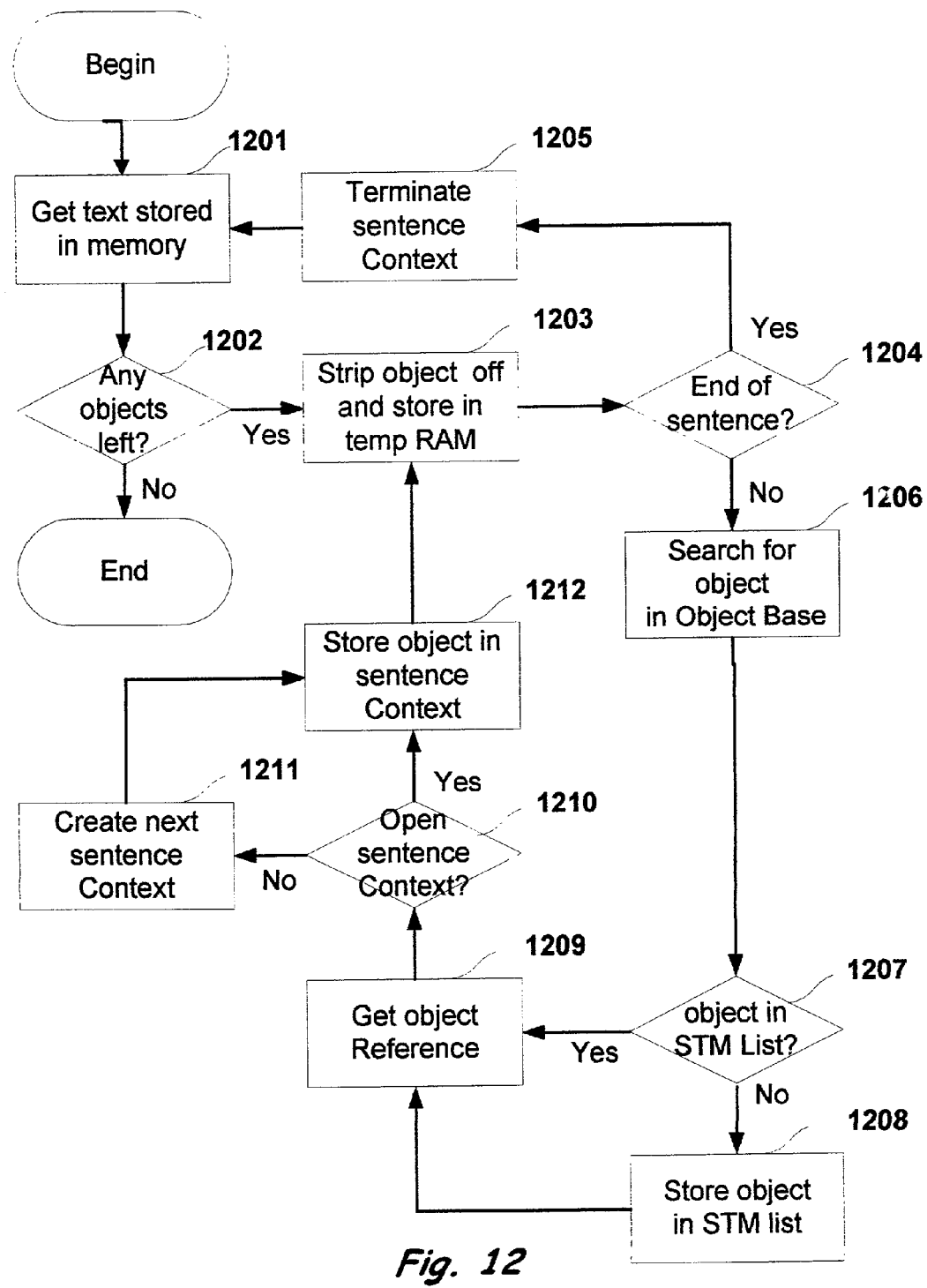
FIG. 12 is a flow diagram showing the process of loading new text into short-term memory.

The invention includes a multi-dimensional natural language processing (NLP) computational system with components and processes that understand and act upon spoken, written, and other forms of human language. The system operates on real-world knowledge stored in a distributed knowledge network (FIG. 3) that exhibits neural network-like structure and content, and uses algorithms to mimic certain brain functions (FIG. 12). The algorithms are preferably optimized to rapidly access and process stored knowledge to interpret the meaning of human language text, and/or perform further processing such as initiating searches or automated business functions, or translating the human language input text from one language to one or more other languages.

The invention embodies a multi-dimensional knowledge network in which each grouping of objects forms a proposition describing real-world knowledge. These propositional groupings consist of objects, including lexical (402) and/or non-lexical objects (403), arranged in a specific order similar to the structure of a molecule. The lexical and non-lexical objects are the atomic structure in the system, and the propositions are the molecular structure. Each molecular proposition may have a weight. When present, the weight of a proposition can be used as its confidence value or probability, for stochastic or fuzzy processing. Adjusting weights in this system is analogous to cognitive learning in a biological organism and is similar in behavior to calculating posterior probabilities in a Bayesian process. The function of the present invention is based upon the following principles:

1. All things in the universe, physical and abstract, can be represented by unique words, symbols, or phrases in human language.
2. Many things in the universe can be represented by other machine-readable objects, such as physical objects represented by images stored in graphical files.
3. There is no thing in the universe, physical or abstract, that is not related to some other thing in the universe.
4. A taxonomy of things or objects can be defined to describe category and part-whole relationships and connect all objects into a single ordered network.
5. Causal chains can be articulated which describe how things in the universe interact with other things in the universe.
6. All relationships between things in the universe can be described in such a way that an explicit relationship "r" (103 and 203) ties two things in the universe together.
7. Explicit relationships "r" (103 and 203) in the universe can be described by a finite set of words that linguistically and logically express the nature of each relationship.

8. Relationships in the universe are governed by context "c" (104 and 204), such that a valid relationship in one context may be invalid or different in another context.
9. Relationships in the universe may be further qualified by constraints "q" (207) that describe unique characteristics of the relationship.
10. All of the objects in a relationship, and the descriptors of the relationship, context, and constraints can be represented by human language words, symbols, or phrases.
11. The combination of a pair of objects, a relationship, and a context constitute a single proposition in which the first or "x" object is the head and the second "y" object is the tail.
12. The combination of a pair of objects, a relationship, a context, and constraints constitute a single proposition in which the first or "x" object is the head and the second "y" object is the tail.
13. All relationships "r" in the universe are abstract things that may also be objects "x" or "y", contexts "c", or qualifying constraints "q".
14. All contexts "c" in the universe are physical or abstract things that may also be objects "x" or "y", relations "r", or qualifying constraints "q".
15. All qualifying constraints "q" in the universe are abstract things that may also be objects "x" or "y", relations "r", or contexts "c".
16. For each proposition in the universe, a level of probability, confidence, or belief may be applied and the confidence value expressed as a weight "w" (105 and 205).

The knowledge network contains both factual propositions and counterfactuals, which are propositions that spread negative or inhibitory activation. The implementation of these principles in the multi-dimensional interpreter is to represent all knowledge in a concise formal logic proposition format based on the above principles. The formula for representing these universal principles into a theory of information is:

$$c \frac{(x\ r\ y)}{w} q$$

This formula is interpreted as follows:

> While c,
> For all objects x,
> ([([(x is related to at least one other object y)
> by an explicit relationship r]
> that may be qualified by a constraint q)
> within a specific context c]
> with a probability of w).

The multi-dimensional knowledge representation scheme consists of an interconnected network of explicit molecular nodes in which the connections may be implied by juxtaposition of objects in object relationship molecules. Alternatively, the objects in object relationship molecules may be tagged using a tagging scheme such as Extensible Markup Language (XML).

These molecules are defined by their vertices, in which each vertex contains an explicit object that consists of an object that can be lexical (one or more words, symbols, or phrases) or non-lexical objects such as machine-readable images and sounds.

Examples of lexical objects include:

| Type | Examples (each example is enclosed in quotes) |
| --- | --- |
| A single character | "A" "a" "!" "2" "#" " " |
| A word or number object | "the" "workload" "parasympathetic" "Saturn" "3,456.29" |
| A compound object | "long-term" "C-SPAN" "Act!" "$350.00" |
| More than one word or number | "crank case" "Abe Lincoln" "1959-1962" "once upon a time" |

Examples of non-lexical objects include:

| Type | Examples |
| --- | --- |
| A graphical image file | horse.bmp, jove.jpg, mars.gif |
| A streaming video file | Rome.avi, citadel.mpg, romulus.vid |
| An audio sound file | thunder.mp3, race.wav, hooves.asf |
| An aroma file | rose.aro, cinnamon.sml |
| A tactile file | ouch.tct warm.tmp |

Each molecule can be represented computationally in sequential manner by ordering the objects such that the sequence begins with the x object as the first ordered object, and sequentially followed by the remainder of the objects. The objects can also contain explicit role labels or tags (for example, x, r, y . . . ). Alternatively, the objects can be arranged such that the label of the object role can be inferred from position in the molecule if all molecules are ordered identically.

This scheme is a linear assembly of objects in which each object plays a role and the organization of the objects constitutes the representation of a single fact. The linear organization of objects is analogous to database records or rows. For example, for the term "Saturn", all of the propositions provided below each represent a fact statement about the term "Saturn".

| x | r | y | c | q | w |
| --- | --- | --- | --- | --- | --- |
| Saturn | name | planet | astronomy | ringed | 0.6 |
| Saturn | name | deity | mythology | Roman | 0.3 |
| Saturn | producer | automobiles | transportation | US | 0.5 |
| Saturn | name | company | commerce | automotive | 0.4 |
| Saturn | brand | automobile | transportation | sedan | 0.3 |

In the above example, the connections may be implied by juxtaposition of objects or their positions in columns. A tagged example of the same may appear as follows:

<x>Saturn<r>name<y>planet<c>astronomy<q>ringed<w>0.6
<x>Saturn<r>name<y>deity<c>mythology<q>Roman<w>0.3

The multi-dimensional interpreter includes an expandable set of algorithms that support interpretation, translation, and further processing. Many of these are heuristic algorithms and may be triggered by the contents of proposition molecules. In one embodiment, a limited set of objects are assigned as relations [r] and contexts [c]. In such an embodiment, the atoms that most commonly trigger heuristic processes are relations [r] and contexts [c].

Internal Structure of the Interpreter

Figure 3:
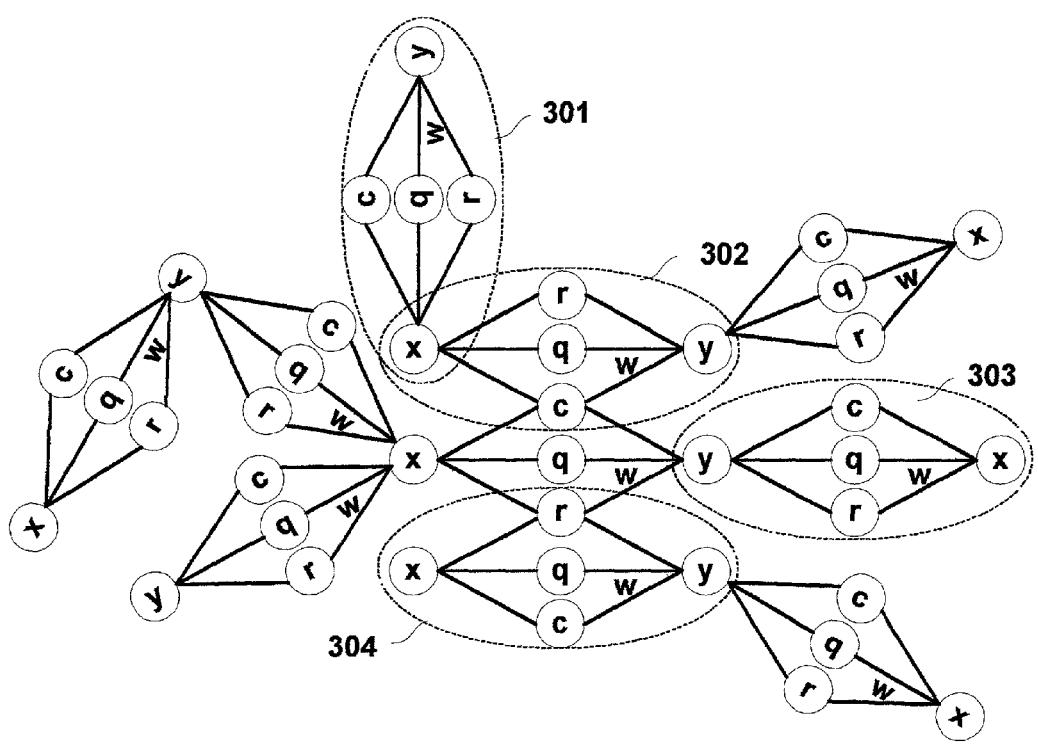
FIG. 3 is an illustration of an interconnected network of weighted propositions.

The above description provides a scheme and structures for forming a knowledge network (FIG. 3). This information is preferably stored in a memory architecture in a digital, analog, or other machine readable format. In order to access the structure efficiently, a gateway structure is preferable. In one embodiment of the present invention, a list is provided as a gateway. The list is composed of a plurality of objects, wherein each object is represented only once in the list. The list may contain both lexical objects (this portion of the list forms a lexicon-402) and/or non-lexical objects (this portion of the list forms an extended lexicon-403), referred to collectively, the lexicon and extended lexicon may simply be referred to as an object base that may contain lexical and/or non-lexical objects.

Generally, to those skilled in the art, a lexicon is a collection of lexical objects that constitute the vocabulary of a language. Similarly, in the multi-dimensional interpreter, the entries in the object base are intended to represent the objects needed to describe the body of human knowledge understood by the system. In order to know about anything, the system utilizing such a list provides an object that can be used to describe or represent that thing. These objects serve as the gateway into the multi-dimensional knowledge network and the nodes in the network. Because each element in a knowledge molecule consists of an object, the object base must possess a corresponding element before a propositional molecule possessing that object can be constructed.

The object base typically may not contain definitions of any of the words or other objects. To serve as a gateway, it may contain links into the knowledge network, whereby a chaining process can be used to connect the objects to encoded knowledge about their meaning and relationships with other objects in the object base. An object in the object base can be an arbitrary combination of characters that bear meaning, as long as it corresponds to something in the human conceptual vocabulary or understanding.

Adding to the Object Base

Two constraints that govern the determination of what goes into the object base are meaningfulness and efficiency. In order to determine meaningfulness, any object considered for entry into the lexicon should fit into one of the positions in a proposition (x, r, y, c, or q). If a valid propositional molecule can be constructed using the proposed object in its entirety as one of the atoms in the molecule, that object is determined to be meaningful.

For maximum efficiency, each atom in a molecule should be indivisible. Indivisibility means that removing any part of the object would change its meaning in the context of one or more knowledge molecules in which the object correctly fits. Indivisibility does not preclude compound lexical objects as described above. For example, the acronym "POTUS" refers to the compound lexical object "President of the United States". Though each of the words may be distinct lexical objects, the aggregation of these words in the preferred sequence bears a specific meaning in a narrowly defined context such as "United States Government".

The organization of objects in the object base may be optimized for the computing platform on which the system resides. For computing platforms with limited memory and storage resources, the structure is of a single alphabetical list. For computing platforms with significant memory and storage resources, the object base is divided into multiple areas in which each of the areas contain objects having similar characteristics.

The object base is a one-dimensional structure or list. It is structured as a list to facilitate and expedite search. As a list, the object base may be decomposed into a hash table to support high-speed search. A relative pointer can be used to reference each object so that, rather than spelling out the entire object each time it is referenced, the pointer can be used as a synonym for the object. One of the primary characteristics that govern object storage is object length. Due to the hash mechanisms that may be used for searching the object base, alphabetic order is not a prerequisite for efficiency or operability.

Structure of a Molecule Forming a Proposition

Figure 1:
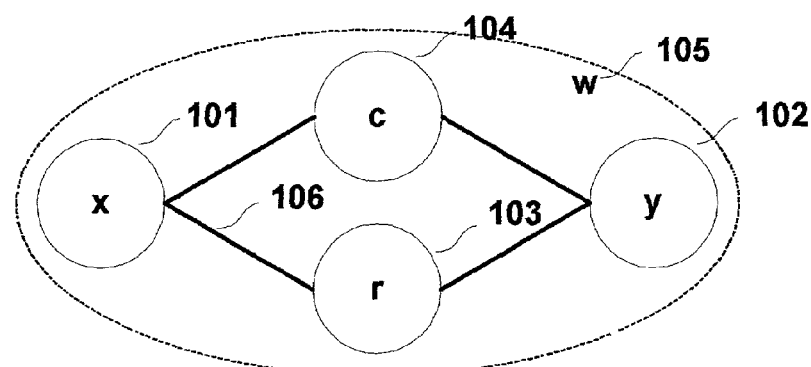
FIG. 1 is an illustration of a proposition of the weighted (w) form x, r, y, c.

FIG. 1 depicts the basic linked structure of a single knowledge molecule. For each molecule, letters may be assigned to each constituent atomic object such that, for example, the head object is assigned the letter "x" (101) and the associated object the letter "y" (102). Objects can be lexical items such as words, phrases, letters, numbers, symbols and the like, or non-lexical items, such as digital image or sound files. Examples of "x" and "y" are the lexical objects "Saturn" and "planet". The explicit relation defining the association between "x" and "y" is the relation or "r" object (103). In the above example, an "r" object may be a lexical object such as "name". This relation is defined to exist within a specific context represented by the context or "c" object (104). Continuing the example, a context might be "astronomy". The entire knowledge molecule representing this proposition regarding a fact in the real world, existing within the named context, is assigned a weight represented by "w" (105). The weight is preferably represented by a numerical value such as an integer. Therefore, the following example is one proposition molecule of the form described above:

| x | r | y | c | w |
|---|---|---|---|---|
| Saturn | name | planet | astronomy | .6 |

The weight may be used to represent an a-priori confidence value of a molecule's correctness to support automated inference. Logical thinking is also called inference, and is based on rules. Typically these rules are based on logic that can be divided into two categories: binary and multi-valued logic.

Binary Logic: Two-valued or dichotomous logic deals with Trues and Falses without anything in between.

Multi-valued Logic: Scales of belief, confidence, or even truth are applied to declarations to express their likelihood, credibility or probability.

Confidence values are used in inference processes to select among multiple possible interpretations, decisions, or solutions. A confidence value applied to a single solution provides the system with a gauge to determine how much trust to place in the solution. Confidence values applied to multiple solutions give the system a basis for determining the best or "fittest" solutions. An answer near or beyond the boundaries of a system's knowledge would naturally get a lower confidence value than an answer that the system was able to generate through a straightforward process with little or no ambiguity. Multi-valued logic is the basis for the preferred Bayesian a-priori probability applied to each individual knowledge molecule then used to determine correctness and fitness.

The confidence values or weights used in the multi-dimensional interpreter may be simple numbers, but they represent the fundamentally fuzzy human phenomenon of confidence. Expressed in fuzzy natural language terms, the numeric weighting system might be interpreted as follows:

```
10 = Absolutely Positive
 9 = Quite Certain
 8 = Sure
 7 = Confident
 6 = Sounds Reasonable
 5 = It's possible
 4 = Uncertain
 3 = Doubtful
 2 = Probably Not
 1 = Cannot Believe It
 0 = Absolutely Not
```

The range of numbers given here are arbitrary. Any symbol set, ordering, and value can be used to represent these values. Additionally, the multi-dimensional interpreter can support specific predetermined heuristics associated with objects in molecules. For example:

| | |
|---|---|
| $ | Whenever a dollar sign object is encountered, the cost/value heuristic may be applied to the object of the input phrase or sentence. |
| Becomes | Whenever the relation atom in a proposition is the object "becomes", a transformation causality heuristic may be applied to the reference to the [x] object in the input. |

Figure 2:
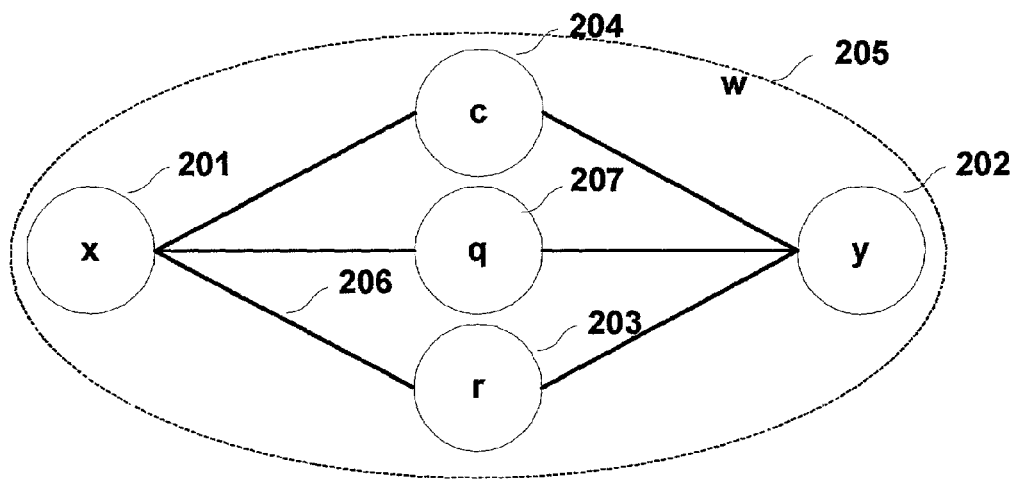
FIG. 2 is an illustration of a proposition of the weighted (w) form x, r, y, c, q.

FIG. 2 depicts a more narrowly defined linked structure of a single knowledge molecule. The head object is assigned the letter "x" (201) and the associated object the letter "y" (202). Again, objects can be lexical items such as words and/or phrases, or non-lexical items such as digital image or sound files. A second example of "x" and "y" are the lexical objects "Saturn" and "deity". The explicit relation defining the association between "x" and "y" is the relation or "r" object (203). The "r" object is typically a lexical object such as "name". This relation is defined to exist within a specific context represented by the "c" object (204). Continuing the example, a context might be "mythology". The entire knowledge molecule representing this proposition regarding a fact in the real world, existing within the named context, is assigned a weight represented by "w" (205) such as an integer. The weight can either be assigned to the molecule as a whole, or to a subset of the molecule such as the link between "x" and "r" (206), or any other combination of constituent objects of the molecule. The addition of a qualifier represented by the "q" object (207) constrains the proposition further, thus narrowing the definition of the context in which this proposition is considered valid. The "q" object may be a formula, an adjective, a date range or any other small information object that can narrow or constrain the interpretation of the fact represented by the molecule. The following example is one proposition molecule of the form described above:

| x | r | y | c | q | w |
|---|---|---|---|---|---|
| Saturn | name | deity | mythology | Roman | .3 |

Relations (103 and 203) in a multi-dimensional interpreter are expressive. They may be capable of triggering specialized functions (heuristics) based on their meaning. To keep the system efficient, the number of named objects that can serve as relations may be limited to a fixed ceiling. While many systems are based on few relations, between two and ten, other systems permit an unlimited number of relations. The multi-dimensional interpreter may support tens, hundreds, or thousands of relations, but in a typical interpreter design only a few thousand should have to be utilized.

FIG. 3 depicts the connection of proposition molecules in the knowledge network. Connections arise from sharing atomic objects. In other words, if any of the atomic objects of one proposition molecule match an atomic object of another proposition molecule, the matching objects logically link the proposition molecules. In many cases, this link occurs at the "x" object or the head of the proposition (301 and 302). In the examples for FIGS. 1 and 2, the fact that the two "x" objects match (Saturn) shows that they are explicitly linked at "x". In another example of the linking structure of the network, molecules sharing another of the above elements, such as the same "r" relation atom may also be linked (304). Again, in the examples for FIGS. 1 and 2, the fact that the two "r" objects match (name) shows that they are explicitly linked at "r". In other cases the link is at the "y" object (303). Matching "c" context atoms and "q" qualifier atoms may also be linked. The further examples below show propositions linked by matching "c" and "q" objects:

| x | r | y | c | q | w |
|---|---|---|---|---|---|
| Zeus | name | deity | mythology | Greek | .5 |
| Homer | author | Iliad | mythology | Greek | .7 |
| Hades | location | underworld | mythology | Greek | .6 |

The "w" weight is not an atom, thus matching weights are not links between molecules.

Additionally, the multi-dimensional interpreter may distinguish between different categories of relations. Each of these relations identifies the type of proposition in which it operates. Examples of relation types are:
1. Hierarchical/Constructive
2. Causal/Active
3. Temporal/Progressive
4. Spatial/Motive
5. Analytical/Ascriptive
6. Linguistic/Expressive
7. Logical/Inductive
8. Judgmental/Responsive
9. Social/Associative
10. Commercial/Transactional The multi-dimensional interpreter may recognize an infinite number of contexts. For efficiency, however, the system can optimize itself to recognize a limited set of contexts, and provide focal processing for a narrow set of contexts.

The knowledge network is a massively interconnected network of propositions of the form described above. The a-priori weighting of individual propositions in the knowledge network represents the underlying probability distribution, thus the accuracy of ambiguity resolution at the object level depends on improving the a-priori weighting of propositions until they are individually maximally accurate.

The interconnectedness and chaotic nature of the knowledge network arises from the facts that:
multiple relations may exist for any object x or y;
multiple types of relations may exist for any object x or y;
multiple roles may exist for many objects x and y (x can serve as a c, q, or r);
All objects are related to at least one other object;
All contexts are interconnected with at least one other context;
All contexts and relations are also objects.

FIG. 3 demonstrates more characteristics of the knowledge network to help compare and contrast the differences between the present invention and typical neural networks based on modern neural network theory. Like typical neural networks, the multi-dimensional knowledge network has nodes connected by weighted links. Unlike typical neural networks:

- The nodes possess explicit complex values comprised of lexical and/or non-lexical objects;
- The weighted links possess the explicit complex values of the propositions they describe;
- The structure of nodes in the network is multi-dimensional, irregular, and unpredictable.

A single node Bayesian network is preferably the base case for processing. For the multi-dimensional interpreter, the single base node, for example, is "intent", implied by its parent, "communication". The multi-dimensional interpreter processes the speech or text communicated to determine intent based on the words chosen. An embodiment of the invention attempts to determine intent at the utterance level in discourse (1607), and at the phrase, sentence, and paragraph levels in written communication, such as literature (1618). Thus the knowledge network contains the solution set as a whole and the a-priori weights are the Bayesian distribution. Filling the context structures (FIG. 7) in Short-Term Memory (FIG. 6) constitutes populating a subset of the Bayesian network which is the aggregate of context structures applied to any given input.

The weights in the knowledge network represent probabilities and the internal structure of each molecule, and the links between molecules represent probabilistic propositions. Thus the knowledge network is a Bayesian style network. As a Bayesian style network, the knowledge network is a multinomial distribution of millions of discreet elements (FIG. 3), each complex in content and able to link with an arbitrary number of other elements. The link structure is, therefore, chaotic and unpredictable.

For efficient processing in the multi-dimensional interpreter, knowledge may be deployed to temporary processing areas that are roughly analogous to human memory. This section describes the preferred embodiment having two divisions of this temporary processing area, Kernel and Short-Term Memory, and the main container structures used in these areas to efficiently manage and process information.

Examples of Storage Structures within the Knowledge Network

The above objects and information regarding their relationships to each other are stored in a digital, analog, or other machine-readable format in a storage structure, such as computer memory. The hardware utilized for this invention consists of either general computing devices that use specialized software to perform these functions, or specialized computing devices that are optimized to operate the specialized multi-dimensional NLP system software. The objects within the knowledge network may be stored in propositions as provided above, or may be stored individually and the molecules may be formed during a portion of the processing of text to be interpreted.

Figure 4:
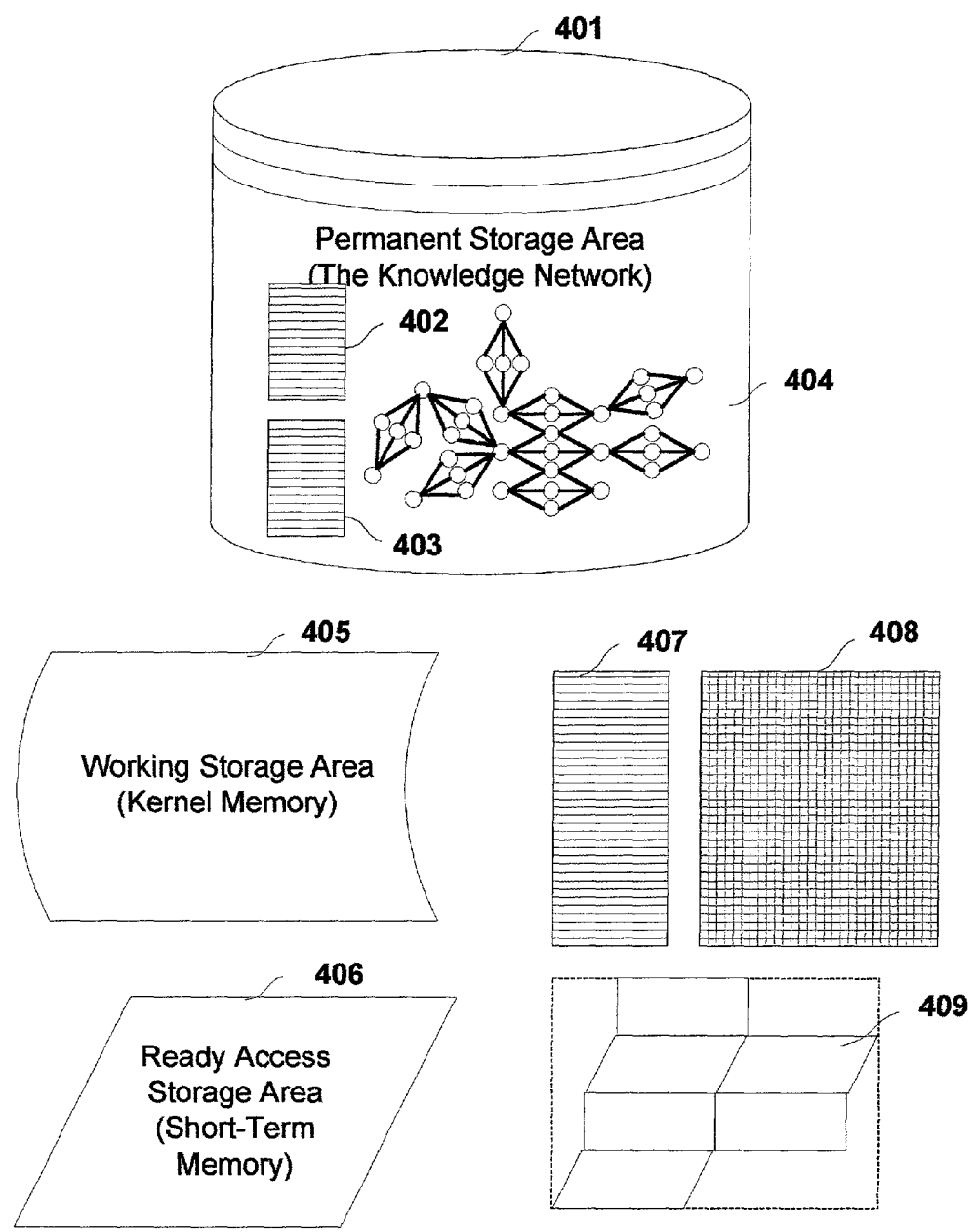
FIG. 4 is an illustration of the major storage areas supporting interpreter processing.

FIG. 4 depicts a storage structure, having the three primary storage areas that may be utilized with the present invention. The permanent storage area (401) contains the knowledge network comprised of the lexicon (402), and/or an extended lexicon (403), and the linked collection of molecular propositions (404). The data in it is not static, in that it can be changed during any learning cycle, but it is the most stable of the three primary storage areas of this embodiment.

The combination of the lexicon and the extended lexicon constitute the object base. The lexicon (402) is a linear list of lexical objects and the extended lexicon (403) is a linear list of non-lexical objects. Both lexical objects and non-lexical objects can be referenced by a sequence of characters. In the case of lexical objects, the sequence of characters could be recognizable as one or more words in a human language. In the case of non-lexical objects, the sequence of characters could, for example, be the name of a file such as "horse.jpg".

The working storage area (405) contains the kernel having such information as user defaults, parameters, and other information used to establish a foundation in memory needed for interpretation processes. The ready access storage area (406) primarily containing lists, matrices, and multi-dimensional context network structures needed for interpretation. Typically, this could be implemented in Random Access Memory (RAM) and could be used to represent human short-term memory.

Any suitable storage medium may be used for the Kernel, short-term memory, and long-term memory. Two such suitable devices are permanent rewritable storage mediums, such as a Winchester disk drive or writable compact disk (CD) drive. Additionally, Random Access Memory (RAM) may be utilized for some or all of the memory structures.

The container structure for housing the processing functions of this device is preferably divided into containers with specific purposes. Preferably, there are three primary types of structures:

A list structure is a specialized single-dimensional list (407).

A matrix structure is a specialized two-dimensional matrix (408).

A context structure is a specialized multi-dimensional network (409).

Each of these structures may be used as an efficient container of information and is preferably managed by a set of manager functions. These functions may create each new container as needed or as processes begin, manipulate the contents during the course of processing solutions, and destroy the container when the contents are no longer needed.

An example of a list container (407) is a structure to hold the sequential list of words encountered in an input string. In this example, the list may contain only the explicit content. This type of container is useful because it preserves and implicitly represents sequence of the list. The sequence of the words in the list may also be needed to make certain processes more efficient. The example below shows the relationship of explicit and implicit attributes of the list structure container:

| Explicit Content | Implicit Sequence |
| --- | --- |
| Jeff | 1 |
| purchased | 2 |
| a | 3 |
| Saturn | 4 |
| coupe | 5 |

Additionally, in this embodiment, list containers in the multi-dimensional interpreter may have a header comprised of a name object that describes each portion of the information contained in the container, such as, the nature of the list, the contents, the length, and/or the starting address of the object in physical memory.

Matrix containers (408) may store information with specific associations that are more complex than can be represented in a simple list. An example of a matrix container may be used by a context structure management function in which each row in a matrix comprises the name object of one of the context structures (FIG. 7), and the columns to the right of the name objects may be used to temporarily store information about the type, size, status, and contents of the context structure as shown in the example below.

| Context Str. | Type | Size/Offset | Status | A State | Assoc. | ... |
|---|---|---|---|---|---|---|
| Identity | Taxonomy | 256 | Pop | R10 | | |
| Time | Taxonomy | 256 | Thresh | S12 | | |
| Space | Taxonomy | 256 | Sparse | S18 | | |
| Taxonomy | Taxonomy | 128 | Pop | S15 | | |
| Response | Language | 256 | Sparse | S8 | | |
| Morphology | Language | 64 | Pop | F5 | | |
| Syntax | Language | 256 | Thresh | F10 | | |
| Semantics | Language | 256 | Reserved | R20 | | |

The headings in the example above are for demonstration purposes, and are not necessarily relevant to the preferred embodiment.

Matrix structure containers are capable of behaving like rows and columns in a spreadsheet and/or a relational database table. As with the list containers (407), each matrix structure container in the multi-dimensional interpreter may be associated with a header that describes the nature of the matrix, the columns and their sizes and contents, the number of rows and the location of the matrix container (i.e., starting address) in physical memory. Accessing the information in the matrix may be done directly by row and column based on information in the matrix structure header.

Kernel memory (405) in the multi-dimensional interpreter is a persistent holding place for information, such as the parameters used in processing, and for information that is expected to be useful in helping to interpret inputs. By retaining information that generally applies to a user, the multi-dimensional interpreter can better disambiguate words or phrases that have different meanings in different contexts. Kernel memory in the multi-dimensional interpreter may contain a collection of parameter information and user context information as propositions (FIGS. 1 and 2) organized in list structure (407), matrix structure (408) and/or context structure containers (409).

Objects in the Kernel may come from different sources, for example:

| User Preferences | (elicited and inferred) |
|---|---|
| User Profile | (elicited and inferred) |
| Discourse Context | (inferred) |
| Operating Parameters | (preset, then adjusted automatically) |

The specific information stored in kernel memory describes contextual data that may apply to the user and/or the domain of information of most interest to the user, for example:
user financial information such as banking services vendor,
user business details, such as
1) line of work,
2) preferences,
social, personal and behavioral information, such as,
3) sports enjoyed as participant or spectator.

The relevance and use of this information is described below in the description of context management (1211). Because the information is stored in context-based propositions, contradictory parameters or user profile information can coexist, as long as the apparent contradictory information is separated by different contexts. For this to work properly, each context used to store conflicting information must be discernable through use of external constraints such as temporal context, spatial context, progressive context, or other contextual data the system is capable of acquiring or inferring.

Parameters are preferably stored in long-term memory and can be used by the multi-dimensional interpreter to control processing functions. Parameters may be set up and maintained by users and some parameters may be inferred by the system as a result of processing input. Parameters include, for example:
Number of objects in each category that are permitted to survive,
Thresholds for each type of object,
Templates for doping.
Examples of operating parameters include:
threshold for inclusion,
threshold for emergence.

Kernel memory may also contain templates to construct the context structures that will be used to interpret contextual content of input.

Information in kernel memory (405) is, preferably, regularly replicated in permanent storage for security. This may be necessary because kernel memory is usually implemented as Random Access Memory, which is subject to erasure when power is interrupted. information retained in kernel memory provides contextual input that may be essential to performing the multi-dimensional interpreter's core context analyses.

Figure 5:
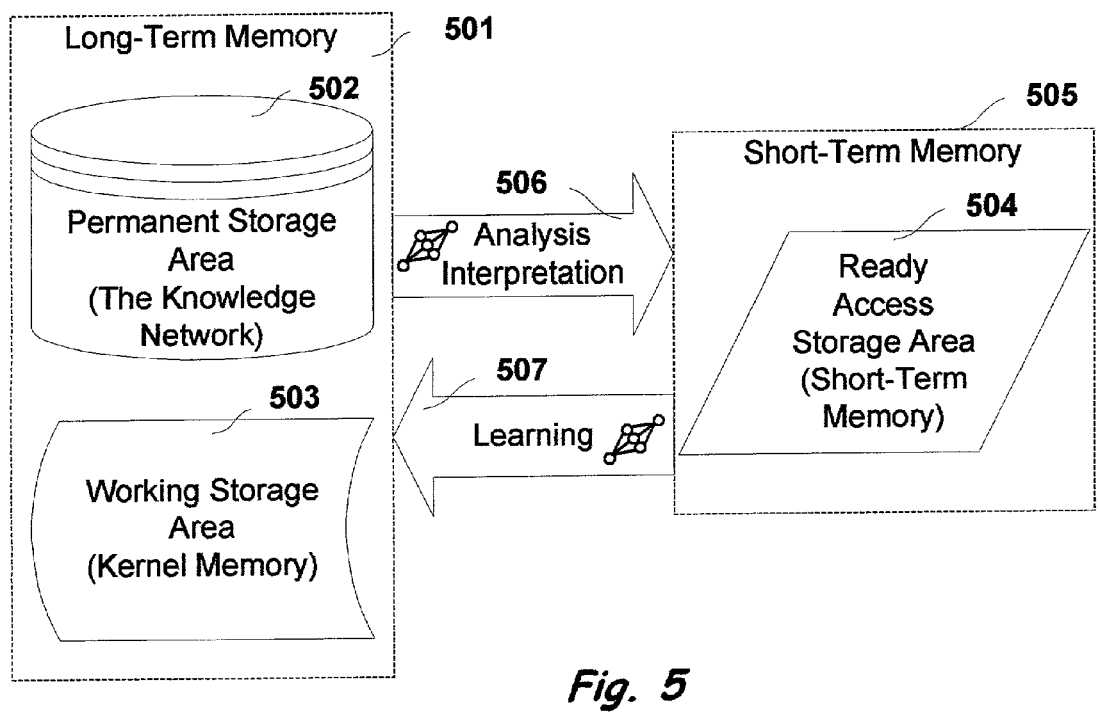
FIG. 5 is an illustration showing the interaction of processes in the major storage areas.

FIG. 5 depicts the interaction between the three storage areas used by the multi-dimensional interpreter. Preferably, two of these areas reside in the part of the system representing human long-term memory (501). They are the permanent storage area or the knowledge network (502), and the working storage area or kernel memory (503). Any suitable storage medium may be used, for example the permanent storage area and kernel memory may be implemented using a Winchester disk drive or a removable disk drive such as a writable compact disk drive.

The ready access storage area (504) preferably resides in the part of the system representing human short-term memory (505). Any suitable readily accessible and changeable storage medium could be used, for example, this area is preferably implemented in Random Access Memory (RAM). During the course of analysis or interpretation, the primary information exchange characterizing the interaction between these storage areas is the transfer or copying of knowledge molecules from one area to another.

Figure 9:
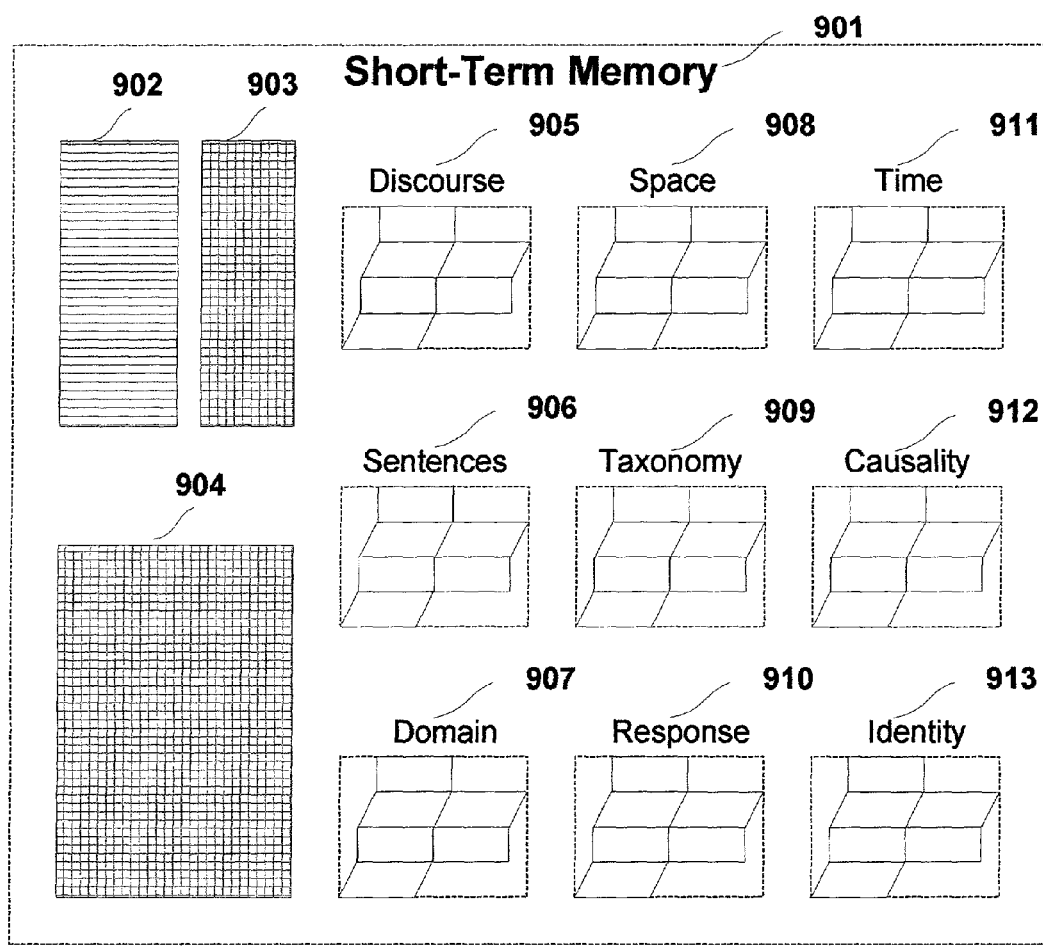
FIG. 9 is an illustration of the processing structures in short-term memory.

In this embodiment, short-term memory (505) is continually changing based on new inputs and correlation of information needed to process new inputs. The overall organization of short-term memory is depicted in FIG. 9. Preferably, short-term memory in the multi-dimensional interpreter acts as a transient holding place for information and containers needed to generate and compare possible solutions or interpretations of the input.

Figure 6:
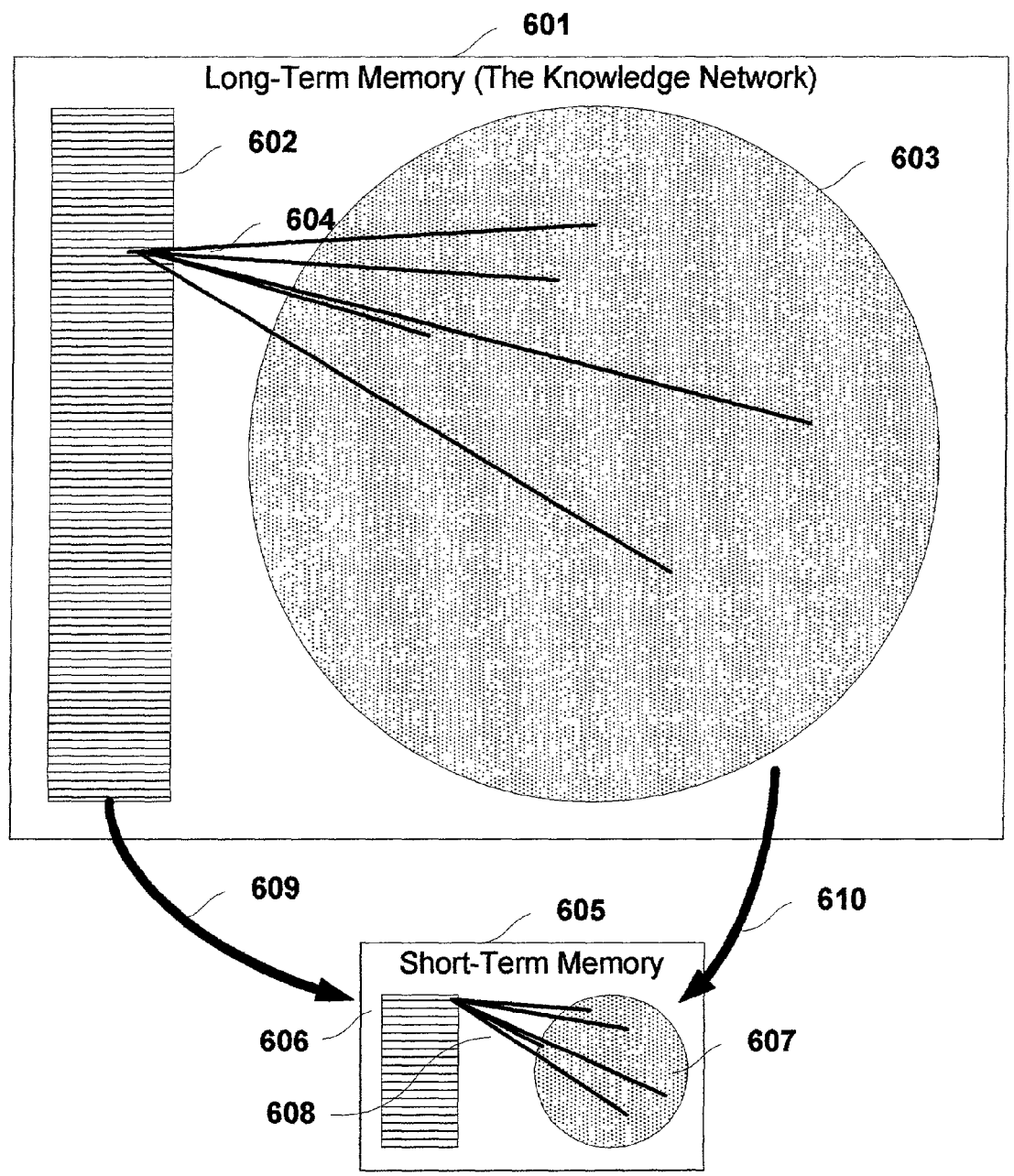
FIG. 6 depicts the relationship between the object base and the network of molecules in long-term memory and short-term memory.

FIG. 6 depicts the relationship between the object base and the network of molecules in the permanent and working storage areas. The object base (602) consists of a lexicon (402) and extended lexicon (403), each of which has links (604) into a network of molecules (603) that are propositions representing facts about the real world. Lexical and non-lexical objects may be copied (609) from the object base (602) to the object reference list (606). Additionally, molecules may be copied (610) from the network of molecules in the permanent storage area to context structures (607 and see FIG. 7) in the working storage area. When molecules are copied, the links between the molecules and the associated objects (608) are preserved.

Dimensionality of the Context Structure

Figure 7:
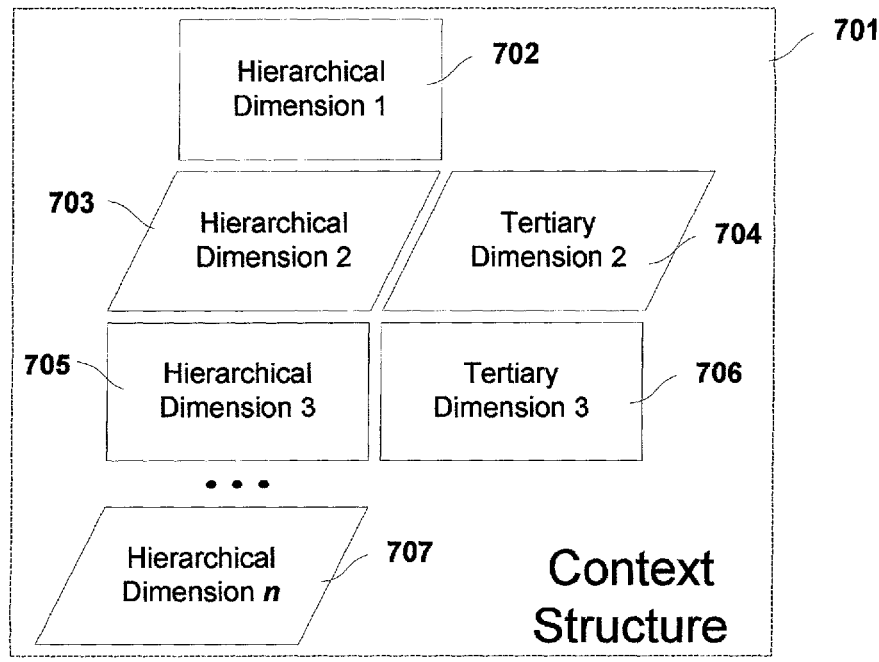
FIG. 7 is an illustration of the components of a context structure in short-term memory.

Within this storage structure information is preferably organized into one or more sequentially ordered schemes. In this way, objects and/or propositions may be more easily located within the knowledge network. FIG. 7 depicts one embodiment of the dimensions of a context structure (701). Each of the dimensions may be a division of the context or a subordinate context.

The top-level dimension (702) preferably forms the top level of an ordered sequence, such as a hierarchy. It is named in its header with a lexical object such as "literature". The second dimension (703) is structurally the same as the top-level dimension, but it would be named in its header with a lexical object such as "mythology" which is a conceptual subordinate of "literature". The third dimension (705) and all dimensions below it (707) would be named with conceptual subordinate objects such as "story" then "character" in descending sequential, in this case hierarchical, order.

The context structure (701) may also utilize one or more tertiary dimensions. Tertiary dimensions are not part of the sequential order, but provide further knowledge associated directly with objects in that level of the sequence. For example, if dimension 2 (703) is "mythology", tertiary dimension 2 (704) could be "Roman" and contain knowledge about the characteristics of Roman mythology as a specific instance of mythology. Similarly, tertiary dimension 3 (706) could be "plot" and contain knowledge about the plot of a specific story that is an instance of a story in Roman Mythology.

Some context structures, such as sentences, space, time, hierarchy, and cause may be constructed in short-term memory for every input. Others, such as context structures specific to the career field of the user, may always be constructed for a given user. Others, such as context structures specifically associated with wireless communications, will only be constructed when the task at hand is a wireless communication task.

For an academician, the following context structure template may exist in kernel memory (405) for an Academic Process Context structure as part of a progressive context structure:

Attribute Names Candidate Profiles

| Teacher | person (8), educational material (6), experience (4), any input (2) |
|---|---|
| Learner | person, student, disciple, researcher, scientist |
| Content | fact, lesson, skill, text, image, sound |
| Retention | learned, remembered, internalized, forgotten, ignored |

Preferably, the context structure container is dynamic and may permit the addition and the selective removal of dimensions as needed to support processing. These dimensions may be implemented as elements of the context structure header (802), consequently, they may or may not be physically collocated in the actual container with the remainder of the context structure. The dimensions that lead to other multi-dimensional spaces can be implemented as pointers or other links to other container structures. Because of the multi-dimensionality of this type of container, the lowest two dimensions of content (804 and 806) are typically not described as rows and columns, but rather, as attributes and candidates. Because some algorithms used to extract correct interpretations from this information may be genetic algorithms, the metaphorical references to "genes" and "chromosomes" may also be used to describe the objects in this type of container, and a dimension may be metaphorically said to contain a "generation".

These dimensions may be stored in the context structure container or in separate gene pool containers referenced by the attributes indirectly. Due to the possibility, however, of a candidate gene bearing conflicting characteristics as it serves as a candidate for different attributes in the same context structure, or for attributes in different context structures, separate instances of like genes may provide additional processing options, and the states of the separate genes may need to evolve or become activated (FIG. 13) separately.

Figure 8:
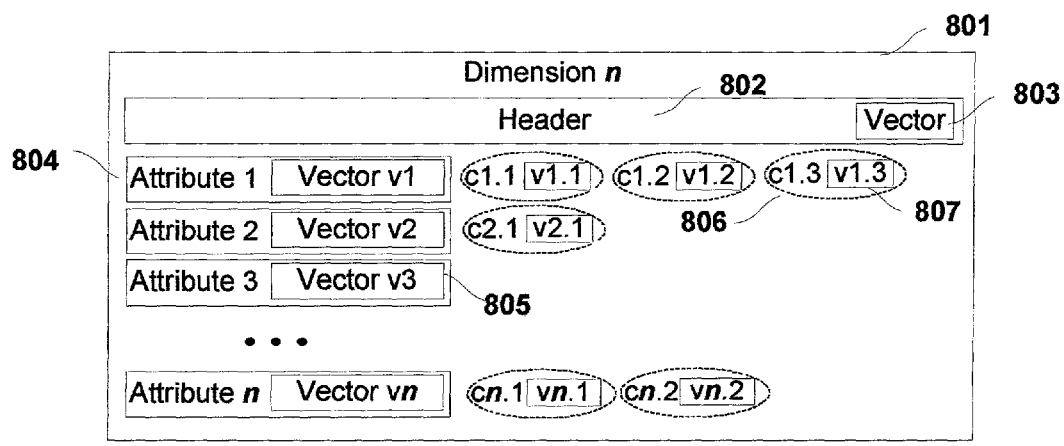
FIG. 8 is an illustration of a single dimension of a context structure in short-term memory.

FIG. 8 depicts the structure of a single dimension of a context network structure (801). Each dimension is comprised of a header (802) with an associated vector (803). The vector is used to track changes in an activation level of the dimension resulting from induced potentials. A dimension may have one or more attributes (804) each with their associated vectors (805) used to track changes in the activation levels of the attributes resulting from induced potentials. Attributes describe characteristics associated with the context of the dimension. For example, a dimension about a specific instance of Roman mythology may have attributes such as "title", "author" and/or "date". Each attribute may have one or more candidates (806) each with their associated vectors (807) used to track changes in the activation levels of the candidates resulting from induced potentials.

An example of such a context dimension may be named "causality". This name would appear in the dimension's header. Just as the name of the dimension in this example is a lexical object, the attributes are often lexical objects. Within the "causality" context, typical attributes may be "agent", "instrument", "action", and "object". Candidates in this example would be molecules whose head or "x" object is evaluated to be the correct type of object for the attribute, and therefore could be the correct value associated with the named attribute. For example, If the input were on the subject of "mythology", a candidate for the "agent" attribute could be a molecule whose "x" object is "author", a candidate for the "instrument" attribute could be a molecule whose "x" object is "chisel", a candidate for the "action" attribute could be a molecule whose "x" object is "inscribe", and a candidate for the "object" attribute could be a molecule whose "x" object is "stone tablet". Additionally, there may be other candidates for each of these attributes.

In the preferred embodiment, the primary container used in multi-dimensional interpreter processing is called a context structure. It is a multi-dimensional vector space in which the container itself, each attribute object, and each candidate object of each attribute possesses an identity and a state vector. The identity of each context structure may be the name of an analysis process or context. The names may be expressive of both the internal processes of the context structure and the result or output. Examples of context structure identities are shown below:

Context Categories Context Examples

| Taxonomical | Time | Space | Construction |
|---|---|---|---|
| Linguistic | Morphology | Syntax | Semantics |
| Logical | Conjunction | Confidence | Judgment |
| Progressive | Causation | Process | Reaction |

The description of FIG. 9 includes further detail about the uses and behavior of these categories of context structures.

Context structure containers may hold and process complex contextual information. In this embodiment, they are the primary structure for performing the fitness algorithm (FIG. 15) necessary for genetic selection. As such, these containers may store information across multiple dimensions. First, the context structure itself may be considered a vector having the fixed dimensions of context identity, and type and has dynamic dimensions of activation state, external associations, and content.

Context structures may be differentiated by a type, such as taxonomical, linguistic, logical and progressive, which tells something about the nature of the context, and provides opportunities for similar processing for contexts of the same type. The header may also contain secondary context and tertiary context information. Each attribute may point to one of the contexts named in the header. For example, the spatial context structure may have a primary context of space, secondary context of location, and tertiary context of motion.

The content of context structure containers is broken up into one or more attribute vectors. The formalism of the context structure containers permits any number of attributes greater than zero. These attribute vectors represent the content dimension of the context structure itself. The attribute vectors, like the context structure, are multi-dimensional, possessing characteristics similar to their parent object.

The candidate elements (806) associated with each attribute (804) in a context structure (701, 801) are also multi-dimensional. Any attribute may have zero or more candidates. These candidate processing structures possess a structure similar to their parent objects as illustrated in FIG. 7.

FIG. 9 depicts the structures in a ready access storage area representing human short-term memory (901). The structures include a plurality of list structures, a plurality of two-dimensional matrix structures and a plurality of multi-dimensional storage structures or context structures. List structures (902) include the list of words encountered in the input and in processing input through the knowledge network in the permanent storage area. Two-dimensional matrix structures (903 and 904) include matrices containing information about the knowledge molecules encountered in processing input through the knowledge network in the permanent storage area, and may contain information used to manage the plurality of multi-dimensional storage structures or context structures in short-term memory.

The multi-dimensional storage structures or context structures include one or more context structures used to contain the discourse as a whole (905) and the sentences from the input text (906). Another context structure would contain the attributes and candidates describing the domain of knowledge or information central to the discourse (907). Other context structures include "Space" (908) used to store spatial attributes and candidates and their vectors, "Taxonomy" (909) used to store ordered object attributes and candidates and their vectors, "Response" (910) used to generate and store natural language responses to questions and other input text, "Time" (911) used to store temporal attributes and candidates and their vectors, "Causality" (912) used to store semantic or causal attributes and candidates and their vectors, and "Identity" (913) used to store attributes and candidates and their vectors for information specific to the user and user activities and preferences, and information specific to other participants in the discourse. Any number of additional context structures may be created.

Because of the slow performance of large Bayesian networks, the problem is decomposed into a plurality of smaller networks called context structures. Using the Bayesian formulas supporting the interpreter, this plurality of structures supports efficient mechanisms to determine individual probabilities of each proposition being relevant to the solution. Segregation of specified contexts facilitates this divide-and-conquer approach. Decomposing the problem treats the propositional constraints independently with their own probability vectors (807), thus using the values of each early constraint to determine likelihood and narrow the possible scope of later or posterior constraints.

Temporal (911) and spatial (908) reasoning are necessary for human beings and autonomous vehicles to navigate and reach destinations without colliding with obstacles. In addition to this obvious application of space and time, many less obvious domains of knowledge involve spatial and temporal constraints. As an example, whenever a product is shipped from a vendor to a customer, the shipment travels through space and time. Specialized context structures described in this illustration may bear responsibility for this reasoning by holding attributes (804) associated with space (location, origin, destination, route . . . ) and time (starting time, scheduled arrival, actual arrival, delay . . . ) and other contexts.

A taxonomy context structure (909) may be responsible for resolving classification associations that lead to correct interpretation. For example, a cat is classified as feline in species mammalia, in vertebrata, in the animal kingdom, unless the word is used as slang to refer to a human being (such as in the colloquialism "fat cat"). In the knowledge network, hierarchical relations may be stored with all other types of associations including ascriptive propositions. Nouns that describe people, places, and things may be described in the knowledge network with hierarchical and ascriptive relations. Thus, it may be possible to infer that a word is acting as a noun when enough hierarchical propositions fire.

Taxonomical context structures may possess at least one more dimension than other types of context structures because of the generational nature of taxonomy and the direct association of attributes and inheritance. The dimensions of a network of this type may be ordered as follows:

- The network may possess a header and one or more attributes which correspond to nouns and nominals in each input sentence.
- Each attribute may possess a header and one or more ancestors such as parents, one or more grandparents, one or more great-grandparents, and one or more great-great-grandparents.
- Each ancestor candidate may possess a header and one or more distinguishing characteristics based on ascriptive propositions.
- Specific characteristics associated with each noun attribute may be captured as a dimension of that attribute along with input links and ancestor candidates.
- Each distinguishing characteristic may possess a vector and pointers.

In causal reasoning, especially in attempting to find missing information or anaphora, a risk exists for the system to identify coincidental co-occurrences as causally linked. The multi-dimensional interpreter uses a threshold parameter that is high enough to filter out and distinguish coincidence from rational causal analysis. This parameter is determined during the verification-learning phase through empirical verification against a large set of coincidental observations and other sentences with actual missing causal constraints.

The context structure responsible for containing and processing these relations is called the causality context structure (912). For interpreting lexical input, the dimensions may be formed as follows:

The network possesses a header and one or more attributes which correspond to semantic roles.

Each attribute possesses a header and one or more verb and/or gerund candidate in each input sentence.

Each verb candidate possesses a header and one or more links to input strings.

The system processes input text by finding propositions that could be linked to each word or object in the text, and placing these propositions into a set of contexts that may or may not help determine the intent of the speaker. The processes that change the vectors associated with each proposition may then show which propositions and which contexts apply to the solution, and which do not. Causal, temporal, spatial and hierarchical contexts are likely to apply to a wide variety of possible inputs. The system also may create very narrow contexts, such as "Roman mythology" and/or "automobiles", one of which may be germane to understanding the intent and/or meaning of a word such as "Saturn".

Regularities in data can lead to reasonable causal conclusions in humans. For example, observing that "no student in the kindergarten class has a birthday after October $30^{th}$, five years ago" may lead to the correct assumption of a cutoff age for students. On the other hand, the correct assertion that "All people who ate pickles in 1875 are now dead" does not establish a proper causal link between pickles and death. Consequently, it is not the goal of the multi-dimensional interpreter to establish causal links unless it is necessary to achieve an accurate interpretation and subsequent processes. Generating a correct paraphrase is an indicator of correct interpretation.

To achieve the goal of correct paraphrases, the multi-dimensional interpreter may attempt to establish causal links. Because of the inherent complexity of the kindergarten example, no causal link would be established. Because of the deceptive nature of the pickle example, a deceptive causal link may be established in generating a paraphrase. A verbose paraphrase might state, "All individuals who consumed a food item called pickles in the year 1875 perished from food-borne pathogens." This would represent the system's interpretation of the speaker's intent in making that statement implying a causal link.

Processing an Input String

Figure 10:
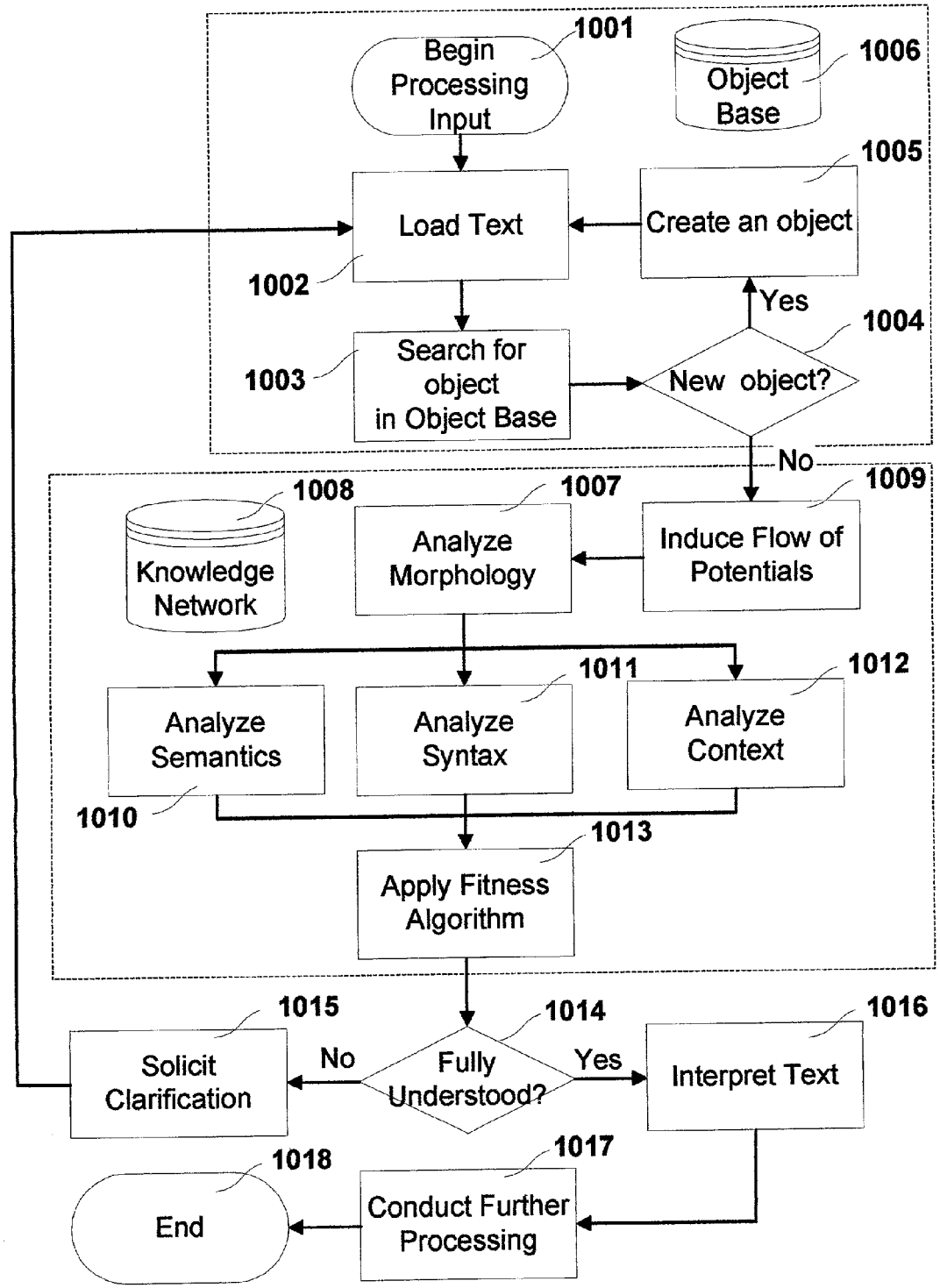
FIG. 10 is a flow diagram showing the overall process flow of interpretation.

FIG. 10 depicts a flowchart of the general steps performed by the interpreter to understand a string of input text. In step 1001, the interpreter is presented with a string of input text. The text may be derived from any suitable input device, such as direct typing on a keyboard, a handwriting recognition device, a file stored in permanent storage such as a disk, or from another device such as a speech recognition program. The text is loaded (1002) into a temporary storage area. In this text loading process, the individual objects are extracted from the input stream based on standard text processing techniques that recognize formatting structures such as spaces and punctuation marks as boundaries between objects.

The interpreter then scans the individual objects and searches the object base (1003) for a matching object. In the preferred embodiment, the object base will contain only zero or one exact match for any given object. If no match is found in the object base search process (1004), a process is initiated to create new object (1005) in the object base (1006). In most cases, a match will occur and the object will trigger the simulated flow of electrical potentials as described in more detail in FIG. 13. The simulated flow passes from node to node in the knowledge network (1008). Once the flow has been induced, multiple analysis processes can be performed through triggering and monitoring potential flow in the knowledge network. These processes may include morphology analysis (1009), semantic analysis (1010), syntax analysis (1011) and context analysis (1012). The sequencing of these analysis functions is not critical to the success of the system, and, where supported by the computing platform, they can be performed in parallel.

Fitness of the Propositions

During and after the analysis processes depicted in 1009-1012, a fitness algorithm (1013—described further in FIG. 12) may be used to improve the outcomes of each of the analyses described above. The outcomes are measured in understanding with an explicit goal to replicate human competence in interpreting written and spoken language. The answer to the question of whether or not a string of input text is understood arises from the aggregate activation potentials of the vectors associated with each word and phrase of the input (605 and 607).

If any vector is below threshold potential (904), the interpreter initiates a process to clarify that aspect of the input that remains ambiguous. This process solicits clarification (1015) by posing a question about the ambiguous aspect of the input. The response is received as input from the user (1001). The new input is applied to the prior input to attempt to achieve full understanding. Once full understanding is determined, the interpretation is formalized (1016) and the formatted interpretation is forwarded to further processing functions (1017) such as translating the input into one or more foreign languages, activating external automated functions or performing some other automated service for the user.

Fitness is a measure of activation. The a-priori weights of propositions (105, 205) in a knowledge network (FIG. 3) may be defined to be pre-emergent, or to represent a base potential (1403). Emergent behavior in the multi-dimensional interpreter is a result of advancing and receding vectors in multiple context structure containers (FIG. 9) in short-term memory (605). The aggregation of these vectors may represent the part of the brain that is directly activated by any input, while the inactive part of the brain is represented by all parts of the overall knowledge network that are not sufficiently activated to be transferred into short-term memory.

This emergent behavior in humans can actually be measured and is described as MERMER or Memory and Encoding-Related Multifaceted Electroencephalographic Response. The same theory governs the processing of input for recognition and interpretation in the Multi-Dimensional interpreter.

Speakers of human language or other text generators exhibit varying levels of competency. The multi-dimensional interpreter algorithm is based on the following critical assumptions:

1) The text is a relatively good reflection of the intent of the speaker or other source of text.
2) With the application of enough contextual constraints, the intended meaning(s) will be discernable.
3) When needed, the system will be able to ask salient clarifying questions (1015).

The selection algorithms that assign, adjust, and interpret fitness are intended to make the first two assumptions valid and the third assumption possible.

Clarifying questions are generated based on missing information or tight competition between more than one possible interpretation. Questions begin with a question word selected appropriately for the needed clarification, and are structured as mirrors of the sentence or portion of sentence they are intended to clarify. For words or phrases whose ambiguity is not resolved, a question may be phrased:

"What do you mean by[ambiguous word or phrase]?"

For ambiguous references to named entities or pronouns (he, she, they), a question may be phrased:

"Who is (are) [named entity or pronoun]?"

Figure 11:
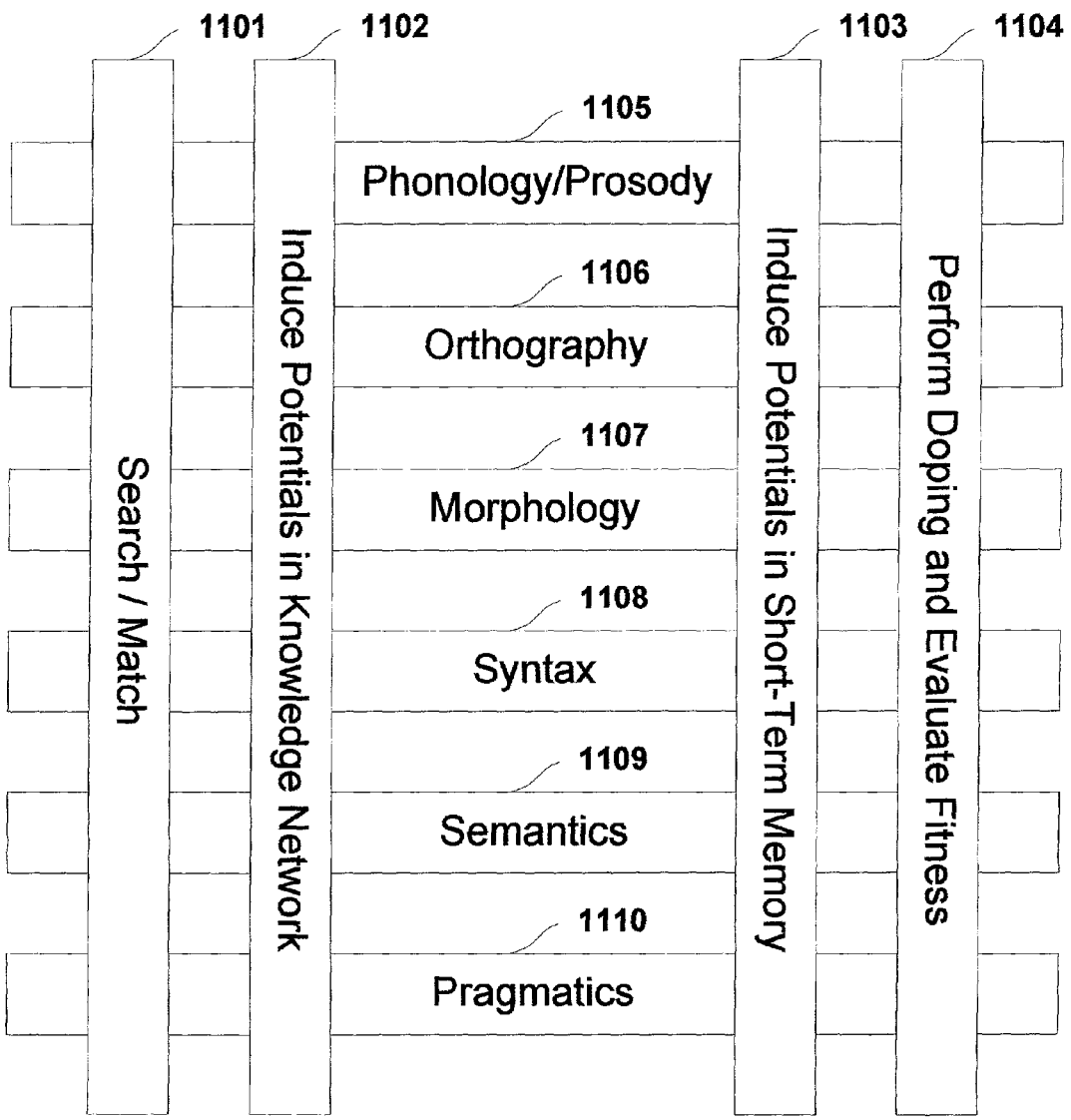
FIG. 11 is an illustration of the interactions of parallel processes involved in interpretation.

FIG. 11 depicts an embodiment having interactions between parallel processes in the interpreter. Search and match (1101) may proceed from the time input is received until the time all input has been compared with information in the object base. Additionally, potentials may be induced in the knowledge network (1102) from the time the first object of input is matched until after the last is matched. These two processes may proceed serially or simultaneously with each other. Furthermore, potentials may be induced in short-term memory (1103) serially or simultaneously with other processes. Doping and fitness evaluation (1104) may also proceed serially or simultaneously with other processes.

Language analysis processes may be performed in conjunction with processes 1101 through 1104. The language analysis processes may include phonology and/or prosody analysis (1105), orthography (spelling) analysis (1106), morphology analysis (1107), syntactic analysis (1108), semantic analysis (1109), and/or pragmatic analysis (1110). Additional language analysis processes may also be performed serially or simultaneously with other processes.

The multi-dimensional processes are designed to operate in parallel against the same input. The parallelism is medium-grained because discreet functions operate simultaneously rather than parallel loop functions (fine-grained) or parallel programs or modules (coarse-grained). The knowledge network is the heart of the multi-dimensional interpretation system so processes that feed into the network are metaphorically described as "diastolic" processes and those in which information is pulled out and processed separately from the network are described as "systolic". Consequently, the parallelism typically has two separate directions as shown with examples in FIG. 11.

Each of the discreet functions may serve to recognize, interpret or resolve ambiguity at a different linguistic or conceptual level as described in the table below.

| Diastolic Processes | Level | Systolic Processes | Level |
|---|---|---|---|
| Context Analysis | Word Level | Evaluate Fitness | Knowledge |
| Syntactic Analysis | Phrase Level | Induce STM Potentials | Concept |
| Semantic Analysis | Sentence Level | Induce Network Potentials | Network |
| Morphological Analysis | Discourse Level | Search/Match | Fact |

In one embodiment, the systolic and diastolic processes above may be implemented to run sequentially on a single processor. In another embodiment, they may run as multiple parallel threads on a single processor. Yet another embodiment may use multiple processors operating in parallel to simultaneously perform more than one of the processes above. In any of the embodiments, the more of these processes that can be completed, the more likely the interpreter will be able to generate a correct interpretation.

FIG. 12 depicts a flowchart of the specific steps performed by the interpreter to "load text" as in step 1002 of FIG. 10. Whether input via keyboard or a voice recognition device, text will be stored in memory (1201) from which the interpreter will retrieve it one object at a time (1202). Each object will be placed in a temporary storage location (1203) until the end of a sentence or sequence is reached. When the end of the sentence or sequence is reached, the context structure (806) (705) will be marked as complete (1205) and/or "terminated". Once a complete sentence or sequence is loaded, the interpreter may be ready to receive additional input or perform other processes. For example, as the preferred embodiment of this invention involves a plurality processes operating in parallel (as shown in FIG. 11), marking the status of structures and information that constitute initial or intermediate results enables other processes that are operating in parallel to identify which data is available to act upon. Marking a sentence loaded into memory as "complete" enables other parallel processes that require complete sentences to proceed.

The interpreter sequentially takes objects from the temporary storage location (1203) and searches the object base for a match. A match yields a reference that is compared with other object references in the memory object reference list (1207). If the object reference is not already in memory, the object is added (1208), otherwise the reference (1209) is captured for placement in a sentence or sequence context. The interpreter searches the memory for an incomplete sentence or sequence context (1210), and if one is not found, a new one is created (1211). Whether an incomplete sentence or sequence context is found or created, the object reference is then stored in its proper sequence in the sentence or sequence context in memory (1212). It is preferred that the memory providing the above functions is short-term memory Creation of new context structures (1211) is one of the methods required to manage context structures overall. Context structure management is a set of functions used by the multi-dimensional interpreter system to define:

which context structures to create,
how to populate them with information,
how to maintain them,
when to perform functions within them, and
when to destroy them.

The behavior of these functions may be self-organizing based on the input, and therefore may be unpredictable. The combination of user context and parameters in kernel memory (405), and activated objects from the knowledge network govern context structure manager functions.

Inducing Flow

Figure 13:
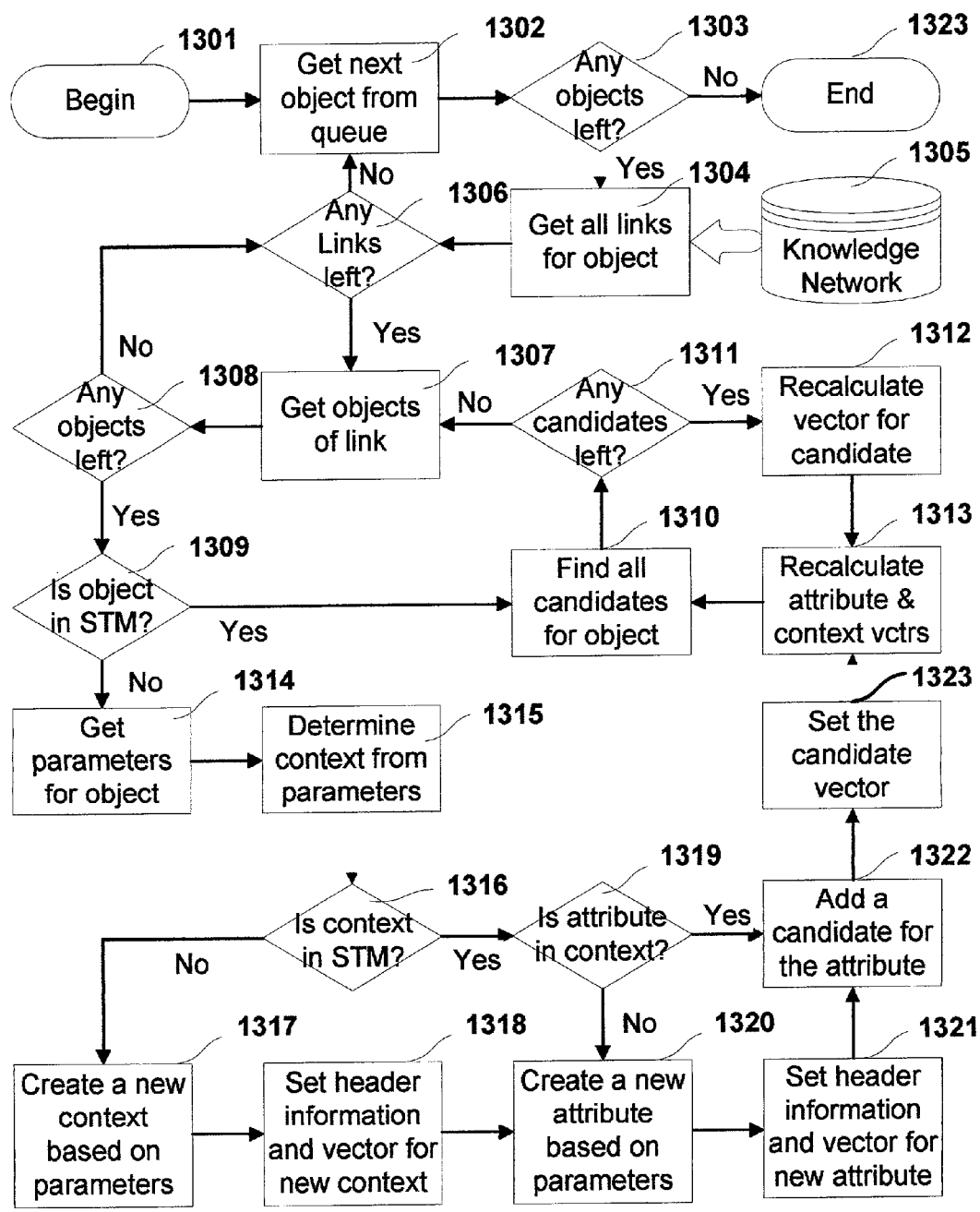
FIG. 13 is a flow diagram showing the process of inducing flow of potentials.

FIG. 13 depicts a flowchart of the specific steps performed by the interpreter to "induce flow of potentials" as in step 1007 of FIG. 10. Objects found through object base search are in a queue after step 1003 depicted in FIG. 10. When there are objects in said queue, it is possible to begin (1301). Step 1302 sequentially removes objects from the queue. One embodiment of this process removes the first object or word that was placed in the queue first, the second next and so on. That process continues until the queue is determined to be empty (1303) at which time the process is ended (1323).

When an object is successfully removed from the queue, the object's associated links to proposition molecules are preferably extracted and placed in a link queue (1304). These associated links may be stored directly in the lexicon and/or extended lexicon in sequence with the object, or the links may be stored in a separate location and referenced indirectly. In either case, the physical location of the information linking objects to molecules preferably becomes part of the knowledge network (1305).

Vector Magnitude and Direction

The links refer to molecular propositions about real-world knowledge. For any object, there may be a plurality of said propositions, each of which is referenced by a link. As any of these propositions may affect the analysis process, the next step is to process each link. As long as there are links remaining in the queue (1306) the links are processed by first decomposing the molecular proposition into its atomic objects (1307). The molecule that is being decomposed is marked as the "current" molecule, and its assigned weight is stored for use in applying either positive (upward) change or negative (downward) change in associated vectors in short-term memory.

As long as there are objects remaining in the molecule (1308), each object is marked as the "current" object and examined to see if a matching object is in the memory object reference list (1309). If a match is found, the next step is to determine the associations between the matching object in the object reference list and candidates in a plurality of context structures in memory (1310). For each of these candidates (1311), the assigned weight of the current molecule is used in a formula to recalculate the vectors of each associated candidate in context structures in memory (1312). The change in the vector of each candidate is then used to recalculate the vectors of its associated attribute and context structure (1313).

Returning to step 1309, if a match is not found, the next step is to get matching parameters for the object in the parameters list in memory (1314). Parameters describe to which context an object is assigned (1315). The context structure for that context may or may not be available in memory prior to the processing of the current molecule (1316). If it is not available in memory, a new context structure is created based on the parameters (1317). The context structure requires baseline information including a starting vector that is stored in its header (1318). Then, baseline attributes contained in the parameters are created for the context structure (1320). If the attribute needed for the specific object is not one of the baseline attributes, it is also added in this step.

It is possible that a context structure may exist in memory for the object, but that it may not contain the appropriate attribute. Step 1319 makes this determination in cases where the context structure already exists. Each new attribute in a new or existing context structure requires baseline information including a vector. This information is placed in the attribute header (1321). The current object for the current molecule is then added as a candidate for that attribute (1322).

The candidate requires a baseline vector, which is determined from the weight assigned to the current molecule. This vector is set in step 1323, following which the value of the vector is used to recalculate the vectors of its associated attribute and context structure (1313). This process is repeated for all objects of each molecule (1308), and for all molecules of the object originally matched in the lexicon (1306). This process can proceed in parallel or simultaneously with other processes of the interpreter.

Figure 14:
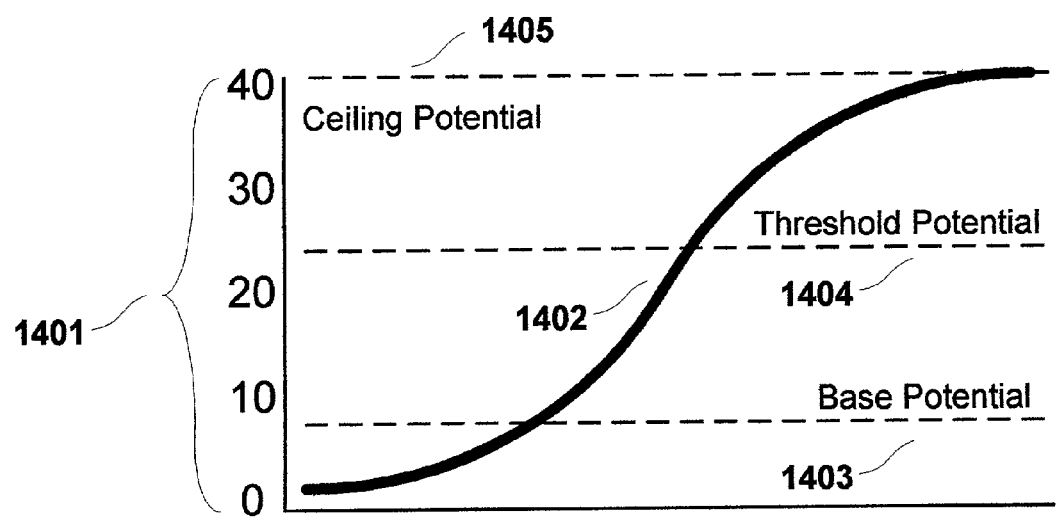
FIG. 14 is an illustration of the possible curve of a vector as its weight changes.

FIG. 14 depicts the possible curve of the magnitude a vector as its weight changes during the course of interpretation, or more specifically, during the course of the wave-like processing that mimics the induced flow of potentials in the human brain. Based on a predetermined numerical scale (1401), the vector associated with a candidate (807), attribute (805), or context structure (803) may rise and fall during the course of the interpretation process. The curve (1402) represents a case in which the vector rises. The base potential (1403) is a predetermined numerical value that may represent the value of the actual weight of a molecule (105 and 205) or the average weight of all molecules in the knowledge network. When a vector is below base potential, it is considered to be negative and can have an inhibitory affect on the process and on its own survival and emergence.

The threshold potential (1404) is a predetermined numerical value at which the vector represents a change of state that is said to "fire" the atomic and/or molecular object and cause it to emerge out of its resting state. This firing process can affect the vectors of other candidates, attributes and context structures in a way analogous to a domino affect of one neuron in the brain receiving excitatory, a positive electrical stimulus, and passing the stimulus on to the next connected neuron across a synapse. Negative or inhibitory potentials can have the same "chain-reaction" impact, except instead of elevating the vectors of linked atomic and/or molecular objects, inhibitory potentials reduce the vectors of linked atomic and/or molecular objects. FIG. 13 shows how excitatory and inhibitory stimuli are transmitted in the preferred embodiment of this invention.

The ceiling potential (1405) is preferably a predetermined numerical value that may represent the maximum weight a vector is allowed to reach or the maximum significant weight of a vector. The numbers used as a scale (1401) may be any numerical range. The specific curve of the change in potential for a single candidate, attribute and/or context structure (1402) is arbitrary and may represent only a small fraction of the activity in an actual interpretation process. Over a short period of time in the interpretation process, the vector may rise and fall any number of times producing an undulating or spiking curve rather than a simple sigmoidal curve. An infinite variety of possible curves exist and depend on the interaction of the input and the knowledge in the network.

The stochastic processes that determine and adjust the fitness of each candidate, attribute, and context structure in the multi-dimensional interpreter operate at the atomic level. This is generally necessary because disambiguation is an atomic level operation that must successfully find the correct meaning or meanings for each object, such as a symbol, word, or phrase. This is possible because every context structure (802), attribute (804), and candidate (806) possesses direct ties to knowledge in the knowledge network both at the atomic and molecular levels. In the genetic or evolutionary metaphor, the rise and fall of atomic object vectors can form the primary mechanism of genetic selection.

From a propositional logic perspective, the fitness of an object is determined from the truth values of the propositions at the molecular level. But unlike typical methods for mapping truth values, such as Venn diagrams or truth tables, the multi-dimensional interpreter preferably uses activation values that are derived from wave processes and doping. Under this structure, the starting value of a vector's object comes directly from the a-priori weight of a proposition (105, 205) in a knowledge network (FIG. 3). As a result of processing, the value may advance or recede based on a combination of the frequency of encountering supporting and contradictory propositions in the knowledge network.

The common use of weights in fuzzy logic or stochastic processes is appropriate as a measure of activation at the atomic object level, therefore, the weight of an atomic object reference to a candidate (807), attribute (805), or context structure (803) constitutes the level of activation or magnitude of a vector. This weight, activation level, or magnitude may be used as the fitness for the genetic processes involved. As such, unlike the weightings in typical neural networks that result in single "winner-take-all" results, the fitness values can result in multiple successful results, thus enabling interpretation of multiple meanings which may be present in text whether intended or unintended by the speaker or generator of the text. In the evolutionary metaphor, these multiple meanings constitute a surviving generation.

Figure 15:
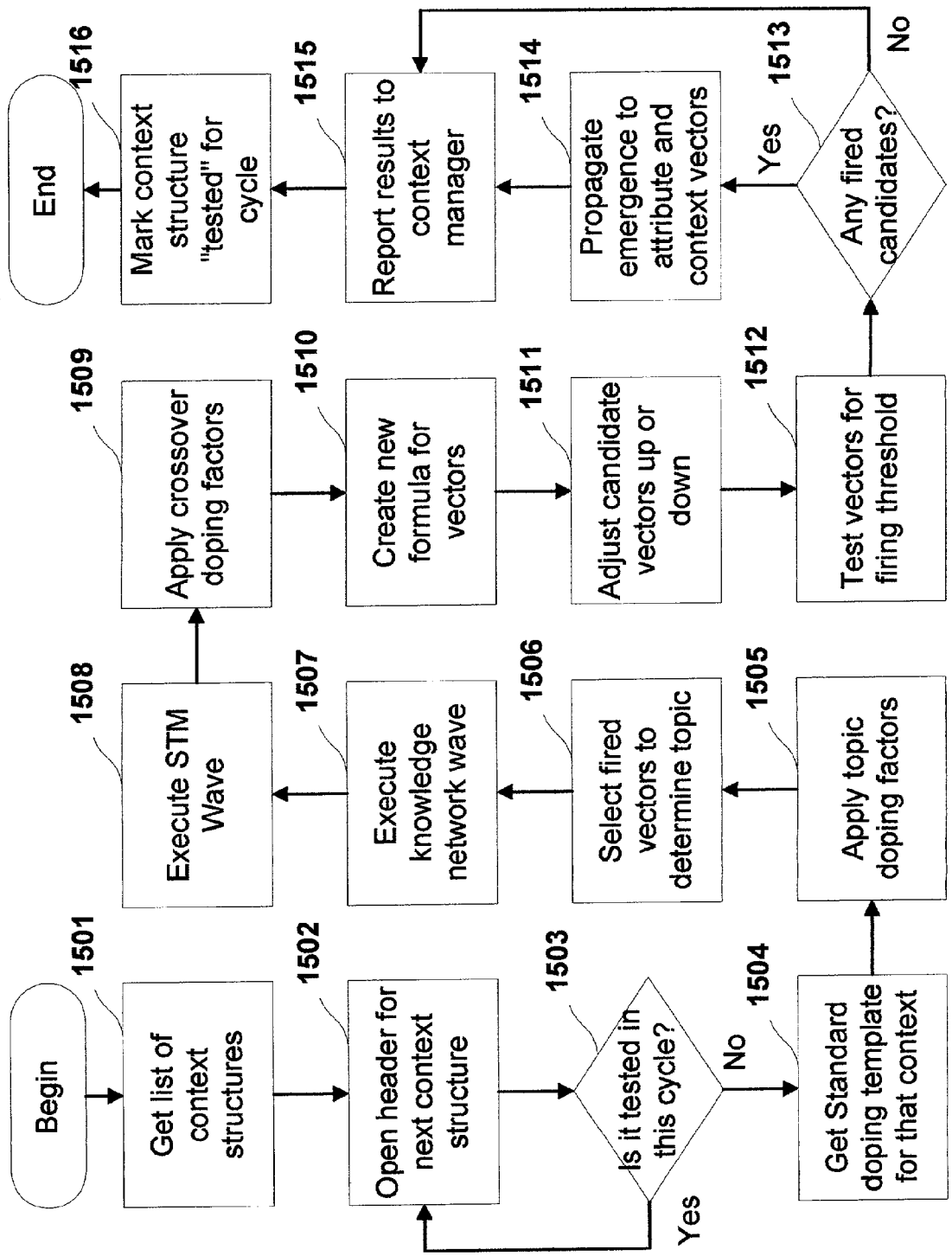
FIG. 15 is a flow diagram showing the process of applying the fitness algorithm.

FIG. 15 depicts a flowchart of the specific steps performed by the interpreter to "apply fitness algorithm" as in step 1013 of FIG. 10. This step may be cyclical and may operate in parallel or simultaneously with other like or different processes. The process uses a list of all context structures that may be stored in memory (1501). For each context structure in the list the next step opens the context structure header (1502) and determines whether or not this context structure has been tested (1503). If not, the context structure is marked as "current", and a doping template for the type of context may be extracted from the parameters (1504). Doping factors may be formulas that may apply different weighting factors to different attributes in a quasi-random manner. Additionally, there may be multiple types of doping factors. The next step in this flow is to apply doping factors associated with the topic of the input text (1505). To determine the topic, one or more vectors in context structures in short-term memory may be examined (1506) to see if they have exceeded threshold potential (904) or "fired".

For any vector whose potential is fired, elevated, or rising, the object associated with the vector is used to trigger a new activation wave (1507) in the knowledge network (shown in FIG. 13). This automatically triggers a reactive wave in the memory area (1508). To skew the impact of the reactive wave in the memory area, crossover or quasi-random doping factors (1509) are applied to create new formulas for elevating and/or lowering vectors (1510). These formulas may then be applied to context structures in the memory area to adjust candidate and/or attribute vectors (1511).

The following step may examine vectors in the current context structure, its attributes and their candidates to see if the vectors have reached or exceeded a threshold potential (1512). If there are any "fired" candidates (1513) their associated attribute vectors and the context structure vector may be adjusted to reflect the firing or emergence (1514). Whether or not any candidates were discovered to have fired (1513) the report of the test (1512) may be delivered to the context manager function or agent (1515), after which the current context structure may be marked as "tested" for the current cycle. The process may operate continuously in parallel with other processes until all context structures have applied the fitness algorithm and completed testing.

The term "emergent behavior" has been applied to the human brain and other complex systems whose internal behavior involves non-deterministic functionality, or is so complex, or involves the interaction of so many working parts that tracing the process from beginning to end is not possible or not feasible. The multi-dimensional interpreter processes may be designed to mimic this emergent behavior. This imitation is achieved through the use of multiple complex contextual constraints (FIG. 9), genetic algorithms to assign, adjust and analyze the fitness of multiple candidates (806), attributes (804) and contexts (802), and threshold logic (FIG. 14).

Threshold logic in the multi-dimensional interpreter involves mathematical functions applied to vectors to determine if the magnitude of a vector (803, 805, 807) is sufficient to merit attention. This logic conceptually places a bar below which activation is insufficient to emerge to consciousness (1404) and above which attention is drawn to a vector. This bar is expressed as a numerical value that is within range of the expected activation potential of vectors to which the threshold applies. Different thresholds may be applied to different vectors and the thresholds for a single vector or for multiple vectors may be adjusted during the course of processing. Because the thresholds are adjustable, the mathematical function of the threshold is a sigmoidal curve (1402).

Context structure containers (FIG. 7) may be a fundamental structure in the multi-dimensional interpreter because they exhibit emergent behavior. The three levels of vectors, container or context level (803), attribute level (805), and candidate level (807), each possess activation levels that represent the fitness of each object. The threshold factor applicable to each of these levels determines whether or not the vector, with its associated object, emerges to consciousness. At or above threshold magnitude (1404), an object at any level is said to emerge or attract attention. Parameters in the system define how many emergent objects in each category are fit enough to survive.

Determining the emergence of candidates in a single attribute of a context structure can be compared to a children's game in which an object is hidden in a room and the person who hid the object guides the contestant to the object by telling them they are getting hotter or colder. The nearer they approach the object, the hotter they are, and the further they are, the colder. In the multi-dimensional interpreter system, candidate, attribute, and context structure vectors figuratively heat up and cool down. An automated interpreter agent searches through all hot context structures for hot attributes and selects the hot candidates (surviving genes) based on magnitude and rate of change, for resolutions to the meaning of the input.

Depending on the stage of the genetic selection process at the time of emergence of any given object vector, the results can be different. The word attention, in the context of emergence, can be applied as the final interpretation of a part of input when emergence occurs at or near the end of the interpretation process. When emergence occurs earlier, it can trigger additional processes such as spawning a new wave of activation in the knowledge network, in short-term memory or both. The new wave of activation has the potential to increase and/or decrease the magnitude of the vector object that spawned the wave, thus potentially forcing it below threshold and deselecting it.

Preferably, the process of selection is based on aggregate activation generated through neural processes in a knowledge network. This process applied to each individual candidate is probabilistic in that the emergence of winning or surviving genes arises from analyzing the probability that this proposition applies to the current input. In other words, each increment of positive and negative activation applied to each candidate respectively increases and decreases the probability that the recipient candidate will emerge victorious. Hence, each increment of activation bolsters or weakens the probability that the recipient proposition will be found true and applicable to solving the problem needed to resolve the meaning of the input.

It is preferred that each context structure vector (803), attribute vector (805), and candidate object vector (807) possesses both a direction and a numeric level of activation. The directions and levels of activation are described in the following terms:

| Direction | Activation |
| --- | --- |
| Rising | Below Threshold |
| Static | At Threshold |
| Falling | Above Threshold |

The combination of the direction and magnitude of activation of each element in each vector constitutes its state. In the present embodiment, there are nine possible states for each element as shown by pairing each possible direction with each possible activation above. Activation can also be implemented, for example, as two states: 1) below threshold and 2) at or above threshold or "fired", which yields only six possible states. Both the direction and activation can be calculated from the vector weight, the previous vector weight, and new activation flow potentials. The original vector weight and other constraints can also be combined, to make the state more expressive or richer.

The multi-dimensional interpreter's use of spreading activation (1507, 1508) proactively draws attention to good candidate meanings. This makes the vectors representing the good candidates rise or emerge (1511, 1512). Other candidates should rise less, retain their a-priori weights, or fall. Because the system is non-deterministic, however, the potential for false positives and false negatives, is significant for any single word in a sentence. The multi-dimensional interpreter's combination of contextual (1110), semantic (1109), syntactic (1108) and morphological analysis (1107), however, mitigates the affect of false positives and false negatives by providing quality checks at each level.

Maximum probability prediction leads to higher error rate, thus the system suppresses maximums during the doping cycles (1509). Weight annealing is a type of formula (1510) used to take a hyper-extended spike associated with a single attribute or candidate, and push it down one or more steps. This is a bias correction function that creates a smoothing effect on the plot of the overall solution. The multi-dimensional interpreter uses past experience and multi-layered analysis functions to determine the appropriate annealing factors for smoothing elevated candidates, thus automatically propagating to their attribute (805) and context structure (803) vectors. Such a formula may be described as follows:

For every hyper-extended candidate (806) in a context structure (FIG. 7), calculate the average distance above threshold (1404) for vectors of all emergent candidates in the other context structures active for the current input, then calculate the difference between the hyper-extended vector's distance above threshold and the average, then reduce the hyper-extended vector by one half the difference.

Many other such formulas may serve as part of a fitness algorithm. When input contains too many unmatched objects, it is possible that no candidates will emerge or survive. In this case the primary strategy is to seek clarification (1015). When input is disjoint or poorly formed, there is a chance that the plot of posterior Bayesian probability will exhibit high peaks of activation with low valleys in between. The low valleys represent missing concepts or gaps. The combination of seeking clarification and the fitness algorithm should be sufficient to bring about an emergent solution.

As a result of the initiatory action of wave activation and the correlative process of the survival algorithm, patterns may emerge in short-term memory. The patterns in the combined context structures may be represented as hot spots where the weights of certain propositions significantly exceed the average weight of the network as a whole and of the portion of the network temporarily active in short-term memory. These heavier weights that emerge as the survivors are hen correlated linguistically and logically to determine their impact on meaning and intent.

Figure 16:
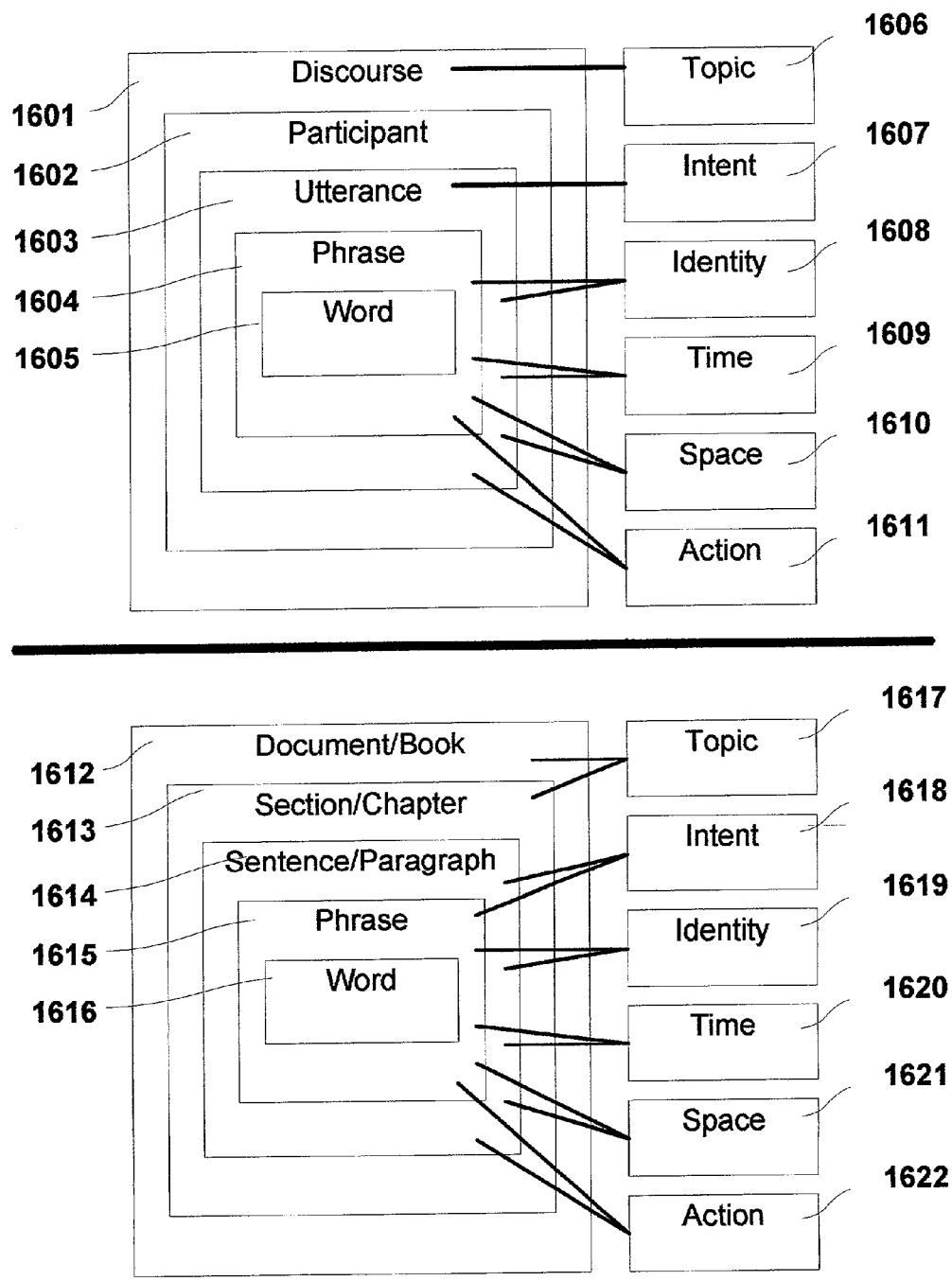
FIG. 16 is an illustration showing the interrelations between linguistic and non-linguistic context structures.

FIG. 16 shows the differences between two primary types of interpretation: interpreting dialog between, for example live discussions between speakers; and interpreting literature such as documents and/or books. In either case there are several levels at which various contextual constraints may impact the interpretation. The levels for discourse are the discourse itself (1601), the aggregation of all things said by each participant (1602), each individual utterance by each participant (1603), each phrase in each utterance (1604) and each word in each phrase (1605).

The contextual constraints may include the topic or topics of the discourse (1606), the intent of each utterance produced by each participant (1607), the identity of individual people participating in the discourse or referenced during the discourse (1608), the time of the discourse and the events discussed during the discourse (1609), the place of the discourse and the events discussed during the discourse (1610), and any actions referenced during the discourse (1611). The lines between the contextual constraints and the levels of discourse indicate at which levels the constraints usually apply.

The levels for literature are the document itself (1612), the chapters and/or sections (1613), each individual sentence and/or paragraph (1614), each phrase (1615) and each word in each phrase (1616). The contextual constraints may include the topic or topics of the text (1617), the intent of each person appearing in the text and/or the author (1618), the identity of individual people appearing in the text and/or the author (1619), the time of the events described in the text (1620), the place of the events discussed in the text (1621), and any actions referenced in the text (1622). The lines between the contextual constraints and the levels of literature indicate at which levels the constraints usually apply.

Example of a Theoretical Lexical Interpretation Model

Figure 17:
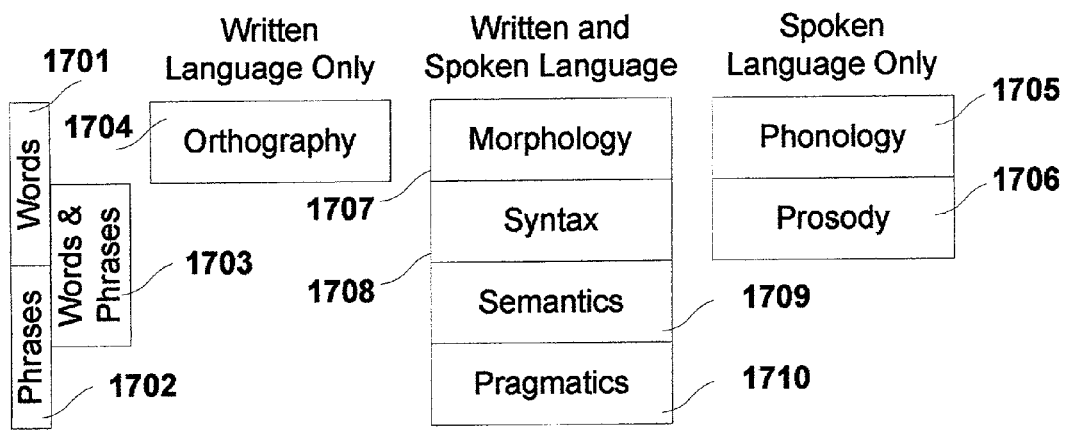
FIG. 17 is an illustration of the aspects of language analyzed by the interpreter.

FIG. 17 depicts the theoretical language model upon which the interpreter is based. In this model, there are words (1701) and phrases (1702) and several stratified layers or aspects of language (1704-1710) that apply to either words or phrases, or to both words and phrases (1703). The top layers of the hierarchical structure are often described as shallow because they are apparent from things you can see or hear, while the lower layers may require some thinking, and therefore, are described as the deeper layers.

The types of analysis of a language object, comprising a word or phrase may include one or more of the following:

1. Orthography (1704) or spelling applies to written language only. Examples of meaningful changes include from correct to incorrect (as in "express" to "Xpress") or from American to British spellings. Though changes in spelling sometimes convey the intent of the writer, it is less common to embed meaning in a change in spelling.
2. Phonology (1705) or pronunciation is similar in that in most speech, standard pronunciations are used, but variations may bear some meaning.
3. Prosody (1706), or the intonation used in the voice can affect the meaning of both words and phrases. Because of prosody, a discriminating hearer can detect irony in a person's tone and interpret the opposite of the typical meaning of a word or phrase. Other emotional cues, such as surprise, distaste, satisfaction or determination can be extracted from prosody even if they are not obvious from any other aspect of the utterance.
4. Morphology (1707) refers to changes in words that can impact their interpretation. For example, affixes such as prefixes at the beginning of words and suffixes at the end of words can change their meaning and often their syntactic part of speech. Adding "-er" to the word "work" changes its syntactic part of speech from a verb to a noun and changes its meaning.
5. Syntax (1708) is grammar and includes analyses of part of speech, tense, number, gender and other structural aspects of language that affect the sequencing of words in sentences.
6. Semantics (1709) is about meaning, and more specifically about thematic roles associated with actions. These roles include "agent" or the person or thing acting, "instrument" or the thing used by the agent to perform the action, "object" or the thing being acted upon., and other thematic roles.

7. Pragmatics (1710) is the area most associated with context and the information governing how a change in context can change the meaning of input text. It includes taxonomical descriptions of objects in the real world, information about time and space and their interaction, and any other physical and/or abstract aspect of the behaviors and interactions of objects in the real world.

The present invention can be constructed and arranged to utilize one or more of the above methods of analysis in its interpretation of language. This invention is capable of encoding and processing information about all these aspects of language.

Pragmatics is the stratum of language that traditionally deals with context and taxonomical relations of things. In the preferred embodiment, the intersection between syntax and pragmatics is designed in the multi-dimensional interpreter as a complex Bayesian style network of nouns, ancestral relations, and inheritable characteristics across multi-generational chains. The design for analyzing pragmatics is centered on a taxonomy context structure.

Semantics is the stratum of language that traditionally deals with causality. In semantics, theta roles are assigned to sentence components that serve as causal links in actions and results. Semantic theta roles include "agent", "object", "instrument" and "action". The intersection between syntax and semantics is designed in the multi-dimensional interpreter as a complex Bayesian network of verbs, theta roles, and causal chains across multi-hop chains. This design is centered on a causality context structure.

The causality context structure is responsible for resolving semantic associations that lead to correct interpretation. For example, a sentence may include information about a PLAYER, a BAT and a BALL. If the theta roles are correctly assigned, the PLAYER would be the "agent", the BAT would be the "instrument", the BALL would be the "object" and the "action" HIT may be inferred from the presence of the other theta components of the sentence. If it is important to the interpretation, other theta components might be inferred such as the action PLAY associated with some object called GAME, and other agents such as PITCHER and CATCHER.

In the knowledge network, causal relations may be stored with all other types of associations. The relation [r] object of such propositions contain a semantic role marker, and the head of the proposition [x] object would be the referent of this marker. Thus it may be correct to infer that a word is acting as a verb when enough causal propositions fire.

Statistically, because so many words exhibit polysemy and most of the possible meanings of any given word are not the intended meaning, the potential for statistical noise to overwhelm the interpretation process is great. In other words, the a-priori weights of every incorrect interpretation of a given word are of no consequence to the speaker who generates speech or text with the belief that listeners will be intelligent enough to ignore all unintended meanings and focus on the intended meaning.

Syntactic Analysis

Syntactic Analysis (1708) occurs in parallel with analysis of other language strata and can be influenced by the results of the other parallel processes. The results can also affect the other parallel processes.

Syntactic analysis in the early stage of real-time input analysis can govern the overall processing strategy by determining the type of sentence represented by the input. Input type parameters may be set automatically or interactively, and used to determine input processing strategy. The input type determination may be used to characterize the input in ways meaningful to adjust the processing strategy. Examples of input types and strategies are as follows:

| Input Type | Processing Strategy |
| --- | --- |
| Exclamation | Record and register exclamation in STM but do not interpret intent |
| Command | Interpret as imperative using heavy user profile and preference weighting and aggressively seek response action |
| Monologue | Interpret based primarily on knowledge network—aggressive learning |
| Conversation | Listen passively, interpret using heavy user profile and preference weighting. Await command storing conversation in STM |
| White Paper | Interpret in aggressive learning mode—Store high-level concepts in core knowledge network and detailed concepts in peripheral knowledge network |
| Technical Manual | Interpret in aggressive learning mode—Store detailed concepts in peripheral knowledge network |
| Novel | Interpret in passive learning mode—Store new linguistic structures in core knowledge network and new propositions in flagged status for manual review |
| Stream of Consciousness | Record and store in STM but do not interpret and take no action until a specific command interrupts the stream |

Semantic Analysis

Semantic analysis (1109) is intrinsically connected to causal reasoning and the progressive context. The multi-dimensional interpreter may attempt to reason about cause and effect. Semantic propositions are examples of things humans may observe and learn, expressed as rules of thumb (heuristics) to make them understandable by a computational system. Cause and effect possess important conceptual qualities: everything is caused by something. The propositions in the knowledge base may call causes "Agents" when intent exists. It is often the case that an Agent needs something to cause an effect. That thing the Agent uses can be called an "Instrument". The effect can be called the "Action". The multi-dimensional interpreter may use terms like this to build formulae useful for semantic analysis.

Here are some causal relations expressed as formulae:

| | | |
| --- | --- | --- |
| Driver | Agent | Ground travel |
| Ground vehicle | Instrument | Ground travel |
| Aircraft | Instrument | Air travel |
| Fly | Action | Air travel |
| Ticket | Instrument | Passenger travel |
| Pilot | Agent | Air travel |

Note that adding context and possible qualifiers could make these formulae more expressive of observable facts in the real world.

Capturing Patterns and Sequences

To accurately interpret natural language input, and later, to perform subsequent processes such as generating reasonable translations when that is needed, requires mechanisms to manage sequence. Sequence applies to individual words, phrases, sentences, and larger segments of text such as paragraphs, sections, chapters, and volumes. The multi-dimensional interpreter maintains sequence of the source or input text by storing the explicit sequence of the input in the sentence context structure.

Sentence Generation

Generation is the process whereby the multi-dimensional interpreter creates new sentences. Before generation can take place, the multi-dimensional interpreter processes all information through all the context structures, then places emergent propositions in the input sentence's context structure in a dimension of the associated lexical item. There are four primary types of sentences the multi-dimensional interpreter generates:

1. Paraphrases
2. Translations
3. Questions
4. Dialogue

Paraphrases can be either concise or verbose. The multi-dimensional interpreter system generates paraphrases by following the structure of the input sentence as represented in the sequence of the sentence context structure, replacing lexical items in the input sentence with synonyms, and adding clarifying details for verbose paraphrases.

Translations can be either concise or verbose. The multi-dimensional interpreter system generates translations by following the structure of the input sentence as represented in the sequence of the sentence context structure, replacing lexical items in the input sentence with corresponding words in the target language(s), and adding clarifying details for verbose translations.

Verbose Paraphrasing

Determining the existence of intervening objects in hierarchical relations is a method of resolving anaphoric references, and in verbose paraphrasing, these intermediate parents become the explanations associated with nouns and can lead to synonyms for the verbs that are accurate and sufficiently expressive to demonstrate accurate interpretation of ambiguous input.

Learning

Preferably, the multi-dimensional interpreter can acquire knowledge or "learn" in a plurality of ways. One way is through knowledge insertion in which any quantity of knowledge is preformatted and added to the knowledge base. This can be done manually or through automated mining processes. Another learning process is called supervised learning in which a combination of manual and automated processes contribute incremental additions and changes to the knowledge base. Fully automated learning is also possible.

Figure 18:
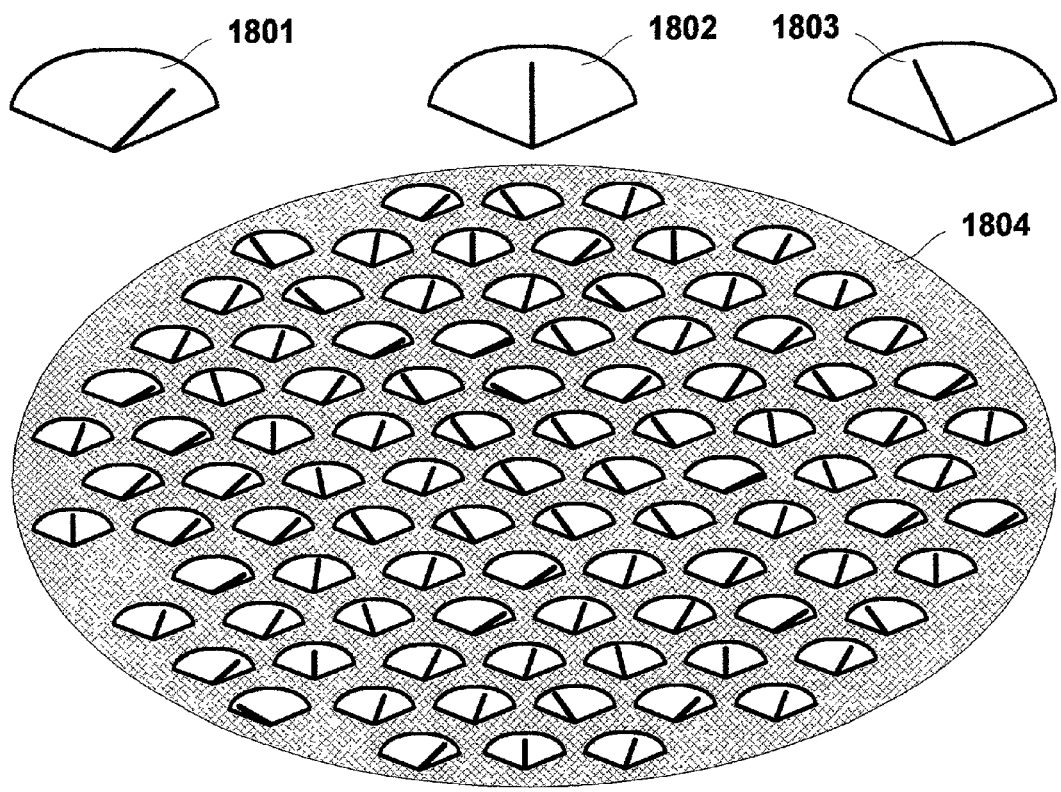
FIG. 18 is an illustration of a knowledge appliance with a human language interface.

FIG. 18 illustrates a perspective of knowledge molecules and atoms associated with learning. In most cases, learning only changes the weights (105 and 205) of individual molecules (FIGS. 1 and 2) one at a time. Consequently, the internal atomic structure of the molecule is not affected. As learning only adjusts the weight upward and/or downward, the illustration represents individual molecules as if they were meters, and the needle of the meter represents the weight. Some molecules may have higher positive a-priori weights (1801), while others may have negative a-priori weights (1802), and others may have generally neutral weights (1803). Using this metaphor, the knowledge network may appear as a massively interconnected network of nodes, each having a different weight (1804).

Though the a-priori weight of any molecule may change dramatically and/or many times during the course of processing, the weight of any molecule in the knowledge network only changes as a result of the learning processes.

Learning from Real-Time Input

In the multi-dimensional knowledge schema, different types of knowledge can be learned independently from associated and dissociated knowledge. For example, an object can be learned and added to the object base (403) without affecting any other object (101) or knowledge molecule FIGS. 1 and 2) in the knowledge network (FIG. 3). The knowledge network can also grow, shrink, and change without affecting the object base, and learning in any part of the network has generally no affect on knowledge in other parts of the network except in cases where a large number of things are learned simultaneously (as from automatic mining operations). For the most part, small local perturbations in the knowledge space, triggered by new inputs, can lead to learning and trigger automated learning processes.

Adjustment of Weights For Existing Knowledge Propositions

During the course of processing inputs, the system may encounter propositions whose a-priori weight is very low that frequently appear and prove true. These weights will need to be adjusted to reflect their reliability or truth value. This goal can be accomplished, for example, by the following algorithm:

```
Given an a-priori weight and
Given a derived emergent weight magnitude, and
Given a rate-of-change graph
    If the derived weight significantly differs from the predicted weight
    based on the a-priori weight
        and the delta rate is consistently strong
    then
        if the derived weight is higher than the a-priori weight,
        increment the a-priori weight by the determined amount,
        or
        if the derived weight is lower than the a-priori weight, decrement
        the a-priori weight by half the determined amount.
```

To reduce the possibility of incorrectly inferring new knowledge structures or weight distribution based on a single high score, the system adjusts weights in the permanent knowledge store incrementally over time, and only a recurring high score will yield a vetted proposition or an adjusted weight.

Figure 19:
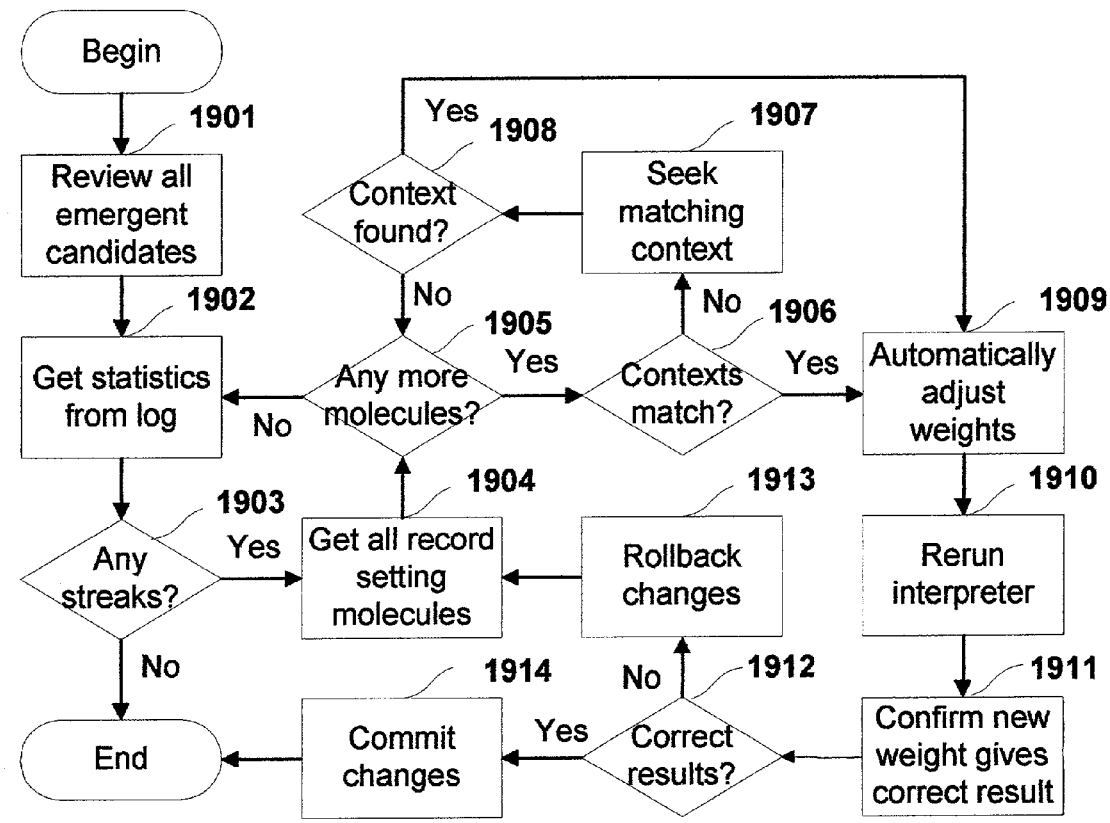
FIG. 19 is an illustration of the process flow of a knowledge appliance device.

FIG. 19 shows a flowchart of the steps of one type of fully automated learning process that may be utilized with the present invention. Based on interpretation activity as described in the embodiments of this invention, short-term memory may have a plurality of context structures (FIG. 7) with a plurality of attributes (804) and candidates (806), some of which may have emergent activation states (1404). A queue of such emergent candidates is created (1901) and a log of activity logged during the preceding interpretation cycles is retrieved (1902).

A prolonged sequence of successful positive or negative activation states may be compared to victories and/or losses, thus a "winning streak" or "losing streak". If the combination of the log and the states indicates that there have been no streaks (1903), then the process ends. If a streak is found to have occurred for one or more molecules, those molecules are placed in another queue (1904). As long as that queue is not empty (1905) the next molecule is extracted, marked as the "current" molecule, and examined to see if its context matches (1906) that of the topic of the input and/or the context structure from which it was taken.

If the context does not match, linked molecules in the knowledge network may be searched to find if there is a match in close proximity in the network (1907). Proximity is indicated by the number of chained links or hops in the network required to find a match. If a matching context is not found in close proximity in the knowledge network, the current molecule is discarded and another is extracted (1908). If the context of the molecule does match (1906) and/or a matching context is found in proximity (1908), the weight of the molecule may be automatically adjusted based on any number of learning heuristics, methods and/or algorithms (1909).

After the weight has been adjusted the interpreter may repeat the process performed on the previous input (1910) to confirm that the new weight gives the correct result (1911). If the result is correct (1912) the weight may be permanently changed in the knowledge network (1914), the process for that molecule ends, and the process may terminate or go back to the queue to get more molecules to process. If the results are not correct, weight in the knowledge network will be left unchanged (1913), the process for that molecule ends, and the process may terminate or go back to the queue to get more molecules to process.

The process described in 1909 may be based on currently available methods, heuristics and/or algorithms. Examples of said methods include "back propagation" used in many neural networks and/or adaptive resonance. An example of a learning method that is unique to this invention is the "Record Territory" learning algorithm described below.

The "Record Territory" learning algorithm is a formula that may be used to adjust weights of propositions in a Multidimensional knowledge base. The name comes from a phenomenon common in sports. For example, when a team or individual is in "record territory", they have exceeded a boundary, such as wins or home runs or some other measure, and continue to produce. During a venture into record territory, the mathematical phenomenon contains four operative numbers:

a) Number of wins constituting the record
b) Number of total wins
c) Number of wins in the current streak
d) Number of losses The behavior of these numbers is as follows:

As long as the team continues to produce wins without a loss, a) remains equivalent to b) and b) grows at a constant rate with c) while d) remains static. With a loss, c) returns to 0 and d) grows incrementally while a) and b) remain static.

For example, if a team's current season win loss record is 15 wins and 2 losses, and 15 is the highest number of wins for the team in any previous season, and they have won the last 8 games then:

| | |
|---|---|
| a) Number of wins constituting the record = | 15 |
| b) Number of total wins = | 15 |
| c) Length of the current streak = | 8 |
| d) Number of losses = | 2 |

As the streak continues, a), b), and c) grow incrementally in lockstep while d) holds. This example shows record wins. The same phenomenon applies to losses, only the names of the variables change.

In a knowledge system with weighted propositions, a record territory learning algorithm tracks the number of times a proposition is hit, then tracks the number of times it proves true as wins and the number of times it proves false as losses. Whenever the number of wins or losses for that proposition in a given processing session or volume (season) exceeds either a previously established threshold or a record, the algorithm adjusts the a-priori confidence value for the proposition. The formula for adjusting the confidence value takes into account the existing confidence value a) (represented by the standing record), the streak, wins and losses.

Positive and negative confidence values may be tracked separately by separate instances of the formula. The formula recognizes the system's maximum and minimum positive or negative confidence values. Consequently, the impact of a new record diminishes for propositions whose values are higher. The function implies mechanisms for permanently storing win/loss data associated with each proposition. In any given learning session, the weight of a proposition cannot be adjusted by more than ¼ of the distance to max weight.

The variables may be constructed as follows:

| | | | |
|---|---|---|---|
| C = | Confidence Value | | |
| R = | Old Record Wins | R' = | Old Record Losses |
| W = | Total Wins or losses in current session | L = | Total Losses in current session |
| S = | Current Winning Streak | S' = | Current Losing Streak |
| T = | Top Confidence Value | B = | Base Confidence Value |
| A = | Amount of adjustment needed | N = | New adjustment temporary factor |
| T-R = | Distance between the existing Confidence Value and the top possible | | |
| R-B = | Distance between the existing Confidence Value and the base | | |

One suitable formula for use with the present invention is:

```
If W>R
    Then NewWeight = C + Calculate Adjustment Factor(R,W,L,S,B,T)
    "The total number of wins is a new record so the old value may be increased"
else
    If L>R'
        Then NewWeight = C - Calculate Adjustment Factor(R',W,L,S',B,T)
        "The total number of losses is a new record so the old value may be decreased"
    end if
end if
Begin Function: AdjustmentFactor(C,W,L,S,B,T)
    ProximityFactor = (T-C)
    "The distance between the old confidence value and the maximum is needed to calculate
    the maximum adjustment which shrinks as the distance shrinks"
    MaxAdjustment = ProximityFactor*.25
    "No single session result can change the confidence factor more than ¼ of the distance to
    the max"
    BaseFactor = W-L
    "Losses reduce the impact of wins so the distance between wins and losses is variable 1"
```

-continued

```
    StreakFactor = 1/((W−S)+MaxAdjustment)
    "The closer the total wins (losses) to the current streak, the greater the impact of the
    current streak. T is always >= S so the + MaxAdjustment eliminates division by 0 and
    moderates the factor"
    RangeFactor = T−B
    "The Range between top and base confidence values constrains the equation"
    ImpactFactor = ProximityFactor/RangeFactor
    "The higher the old record, the less impact the adjustment should have on the confidence
    value."
    N = ProximityFactor * BaseFactor * StreakFactor * ImpactFactor
    "The value of T cannot exceed MaxAdjustment"
    if N > MaxAdjustment
        Then AdjustmentFactor = MaxAdjustment
        "The value of T cannot exceed MaxAdjustment"
    else
        AdjustmentFactor = N
    End if
End Function
```

Add a New Proposition

When, in the course of processing a real-time input, a sentence states a general proposition that appears to be a statement of fact that applies outside a narrow context and is based on two attributes in a single context structure, a new proposition may be formed wherein the x and y objects of the new proposition become the attributes, and the context is derived from the context structure header. The weight is set initially at a lower middle bracket weight. The proposition would be assigned a new reference number and that reference would be placed in an object base association matrix. New propositions may be flagged until, in the course of a plurality of subsequent input processing events, the proposition itself emerges. Once this occurs the flag may be removed and the attribute may become a vetted permanent part of the knowledge network.

When two candidates, that are not currently linked in any existing proposition, rise alone in a session to emerge within two attributes that have a known association, a new proposition molecule may be inferred and created, and context may be assigned based on the most appropriate context structure. The weight may be set initially at a lower middle bracket weight. The proposition would be assigned a new reference number and that reference would be placed in the object base association matrix. New propositions may flagged until, in the course of a plurality of subsequent input processing events, the proposition itself emerges. Once this occurs the flag may be removed and the attribute may become a vetted permanent part of the knowledge network.

Figure 20:
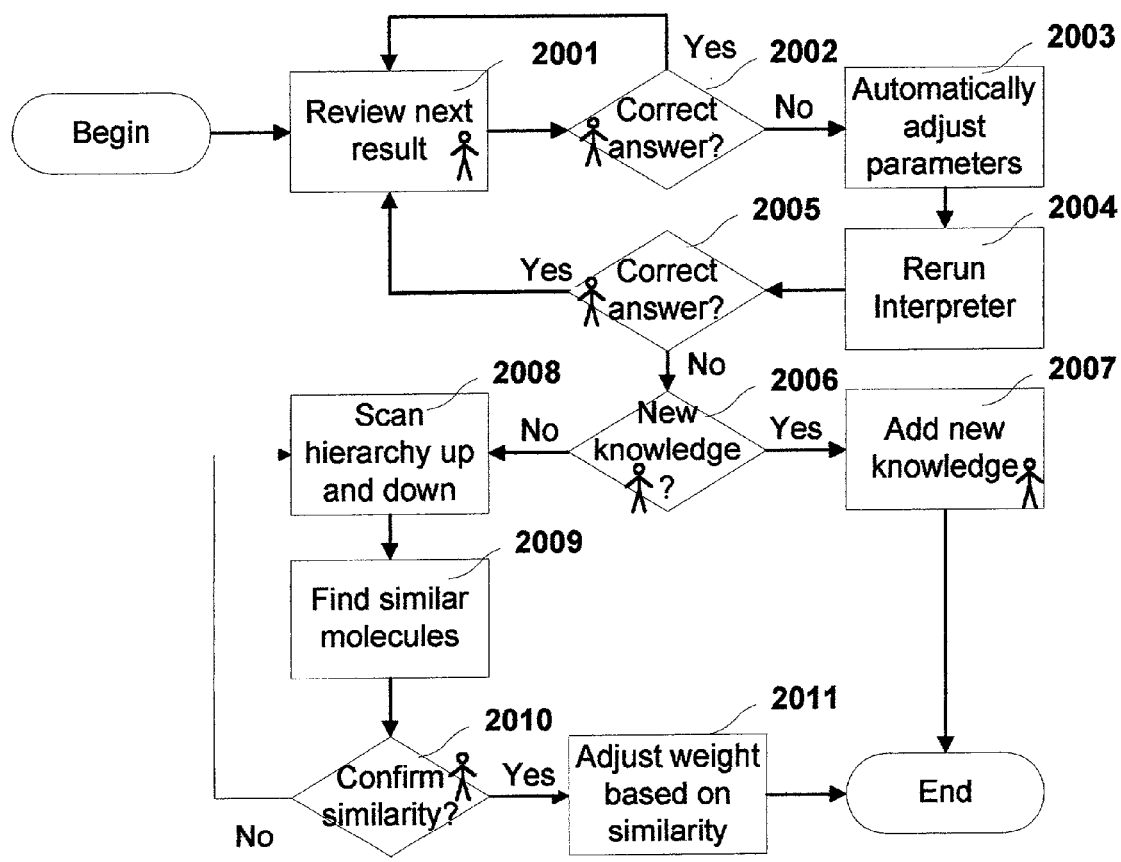
FIG. 20 is an illustration of the process flow of a knowledge appliance device.

While FIG. 19 describes fully automated learning, FIG. 20 is an example of an embodiment using "Supervised Learning" in which a person participates in the process. In this illustration, a stick figure person is used to indicate which processes involve manual intervention.

Context Structure Learning

During the course of processing inputs in Context structures, as attributes occur more frequently, they will rise to the top of the attribute list in the template, thus the ordering of attributes in the template and their a-priori vector magnitudes will reflect the experiences gained through processing inputs.

Adding an Attribute to a Context Structure Template

If while processing a real-time input, the system encounters an emergent attribute proposition with context matching the context structure context but which is not contained as an attribute of the context structure template, the system may add the attribute to the template and may flag it for validation. If in the course of a plurality of subsequent input processing events, the attribute yields emergent candidates, the flag may be removed and the attribute may become a permanent part of the template.

Learning and Supervision

Confidence values that can be applied to a-priori weighting for knowledge molecules (FIGS. 1 and 2) are harder to infer from source text or elicit from an expert than structure (new knowledge molecules), thus we may seek structure in the acquired materials and translate them to confidence values only in the course of input processing and often with the supervision of human instructors.

Supervised learning has many different forms and strategies. Some strategies combine automated and manual processes. FIG. 20 illustrates the flow of process steps of such a strategy. A speaker of the language being processed may review the results of an interpretation process (2001). The results may be in the form of a paraphrase such as a verbose paraphrase, a clarifying question, a translation and/or any process triggered as a result of the input. If the reviewer determines that the result is satisfactory and/or correct (2002), the result is accepted and the next result may be reviewed (2001). If the reviewer determines that the result is not satisfactory and/or correct (2002), automated processes may be used to adjust the parameters (2003) associated with the formulas for processing inputs in the context structure and/or structures most involved in the interpretation process.

Once the parameters have been adjusted, the interpreter may be automatically rerun (2004) to reinterpret the same input using the new parameters. In this embodiment, adjustments to parameters in step 2003 would be very small incremental adjustments. If the reviewer determines that the parameter adjustments have affected the results either positively or negatively, but not sufficiently to yield a satisfactory or correct result (2005), the reviewer may request that the system cyclically repeat steps 2003 and 2004 one or more times with incremental adjustments to determine if the adjustments in parameters improve the result.

If the reviewer determines that the result is not satisfactory and/or correct (2002), the reviewer may stop the parameter adjustment process and proceed to the knowledge network adjustment process. Adjusting the knowledge network involves adding new knowledge molecules and/or adjusting the a-priori weights of existing knowledge molecules. If the reviewer determines that new knowledge is required (2006), a process to permit manual or automated knowledge acquisition (2007) may be initiated. If the reviewer determines that the existing knowledge is correct but its weight may need adjustment, manual and/or automated processes to adjust the weighting may be initiated. One automated process may scan the knowledge network upward and/or downward (2008) to seek similar molecules (2009). The reviewer may conduct a manual review of the results of the scan (2010). If the reviewer determines that the initial scan failed to produce appropriately similar molecules, extended scans may be conducted (2011). If the reviewer determines that the initial scan successfully identified similar molecules, the molecules that originally produced the unsatisfactory and/or incorrect result may be adjusted based on the similar molecules' weights (2012).

Initiative learning processes may use a linked review over the knowledge space to find new distributions or propositions. A similarity function may be used to infer such facts from existing knowledge.

Figure 21:
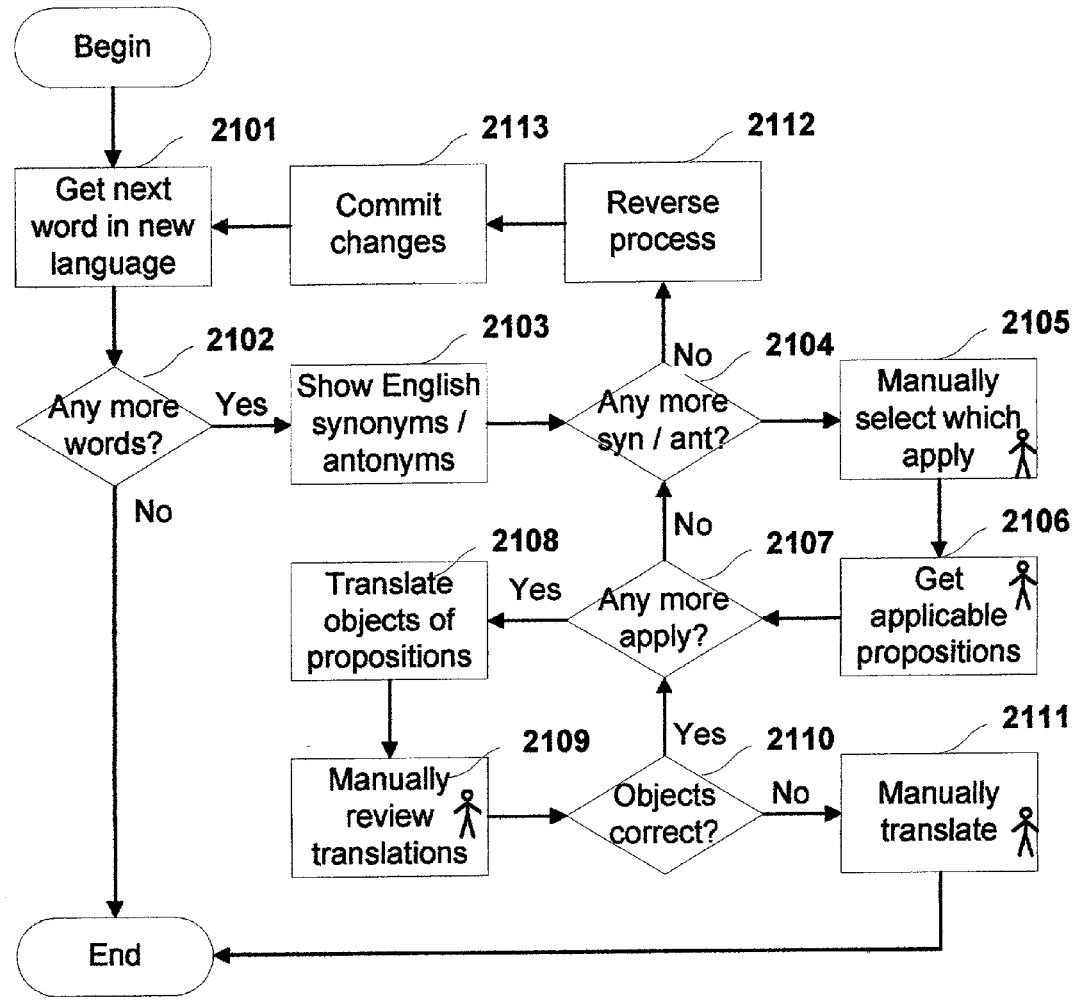
FIG. 21 is an illustration of the process flow of a knowledge appliance device.

New language learning may involve specialized processes including automated and manual learning strategies similar to the ones described in FIGS. 19 and 20. An example of a new language learning process may be defined as shown in FIG. 21.

Given a lexicon for a new language and a knowledge network for English, the learning process may involve creating associations between the new lexicon and existing propositions, then replicating the English language propositions in the new language. For this to support high-quality translation, the knowledge network should remain intact without losing or changing existing proposition molecules, and it should not gain so many new molecules as to represent separate worlds. The challenge is to add new propositions to the knowledge network that are truly needed to work with the new language. Then the new propositions also should be associated with appropriate English words. If there are no English words that match closely enough, the preferred embodiment defines a strategy to create a new English idiom to use with the new propositional molecules. These are examples of the learning steps:

For each word in the new language's lexicon (2101 and 2102), display English synonyms and antonyms (2103). Then for each synonym and antonym (2104), determine which synonyms and antonyms apply (2105) and get all existing propositions associated with each applicable English synonym and antonym (2106). From the set of associated propositions, manually select those propositions that apply to the new lexical entry (2106). As long as there are more applicable propositions to process (2107), the system translates atoms for that proposition (2108) for validation. A person may manually review the translations of the atoms of the proposition (2109), and if the translations are correct (2110), proceeds to the next proposition (2107). If the system's attempt to translate the atoms are not all correct (2110), a person may manually identify incorrect atom translations and replace with correct translations (2111). This process is repeated for all propositions (2107) for all synonyms and antonyms (2104). Once this is complete, the system may display the new language synonyms and antonyms, insure they are correct, reverse the process treating the new language as the source and English as the new language (2112). At the completion of that step, the changes to objects and knowledge molecules made may be permanently committed to the knowledge base (2113).

Figure 22:
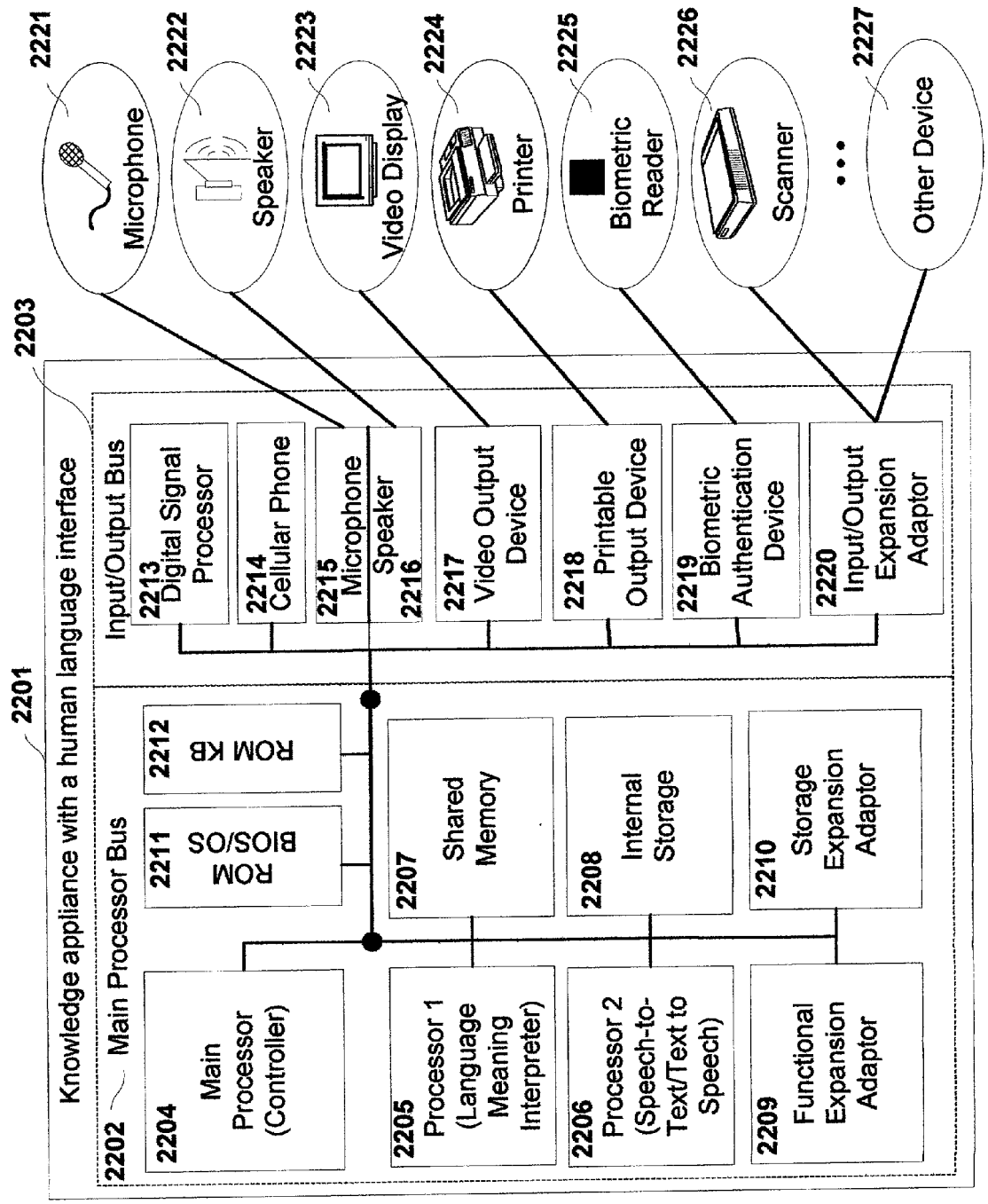
FIG. 22 is a schematic view of the organization of components in one embodiment of a knowledge appliance device.

FIG. 22 depicts the organization of components in one embodiment of a knowledge appliance device (2201) that incorporates the ability to interpret human language input and use the interpretation to perform processes on behalf of a user. In this embodiment, the overall design may be divided into two busses, the main processor bus (2202), and the input and output bus (2203). The main processor bus may have a single processor, or may have multiple processors as shown in the illustration including, but not limited to, the following:

A main processor (2204) used to coordinate computational processes.

An additional processor (2205) used to perform a specific set of functions such as language interpretation.

An additional processor (2206) used to perform another specific set of functions such as speech-to-text conversion.

The devices depicted in this illustration may be comprised of a single chip or a set of chips and/or other electronic devices such as resistors and/or capacitors, and/or of any other machine configuration needed to process information in the ways described in the preferred embodiments and/or claims. A knowledge appliance may also be presumed to have other components needed to support computing such as multiplexers, routers, and system clocks.

Memory in the device (2207) may be shared between multiple processors or segregated to support individual processors. Memory may be augmented with at least one internal storage device (2208). This embodiment shows a pair of expansion adaptors, one to add functional capabilities to the device (2209) and one to add memory or storage capacity (2210). Though it is common for a computing device to have a read-only memory (ROM) to store the basic input and output system (BIOS), this invention may have both the BIOS and operating system (OS) in the same device or device cluster of devices (2211). It also may be appropriate to use ROM (2212) to store the core knowledge base (KB), though this is not a requirement because the shared memory (2207), internal storage (2208) and/or expanded storage (2210) could be used for this purpose.

The input and output bus (2203) is connected to the main processor bus (2202) by circuits that permit the transfer of electronic signals between them. Signals transferred between busses and between devices on the busses may carry computational instructions and/or data. A digital signal processor device (2213) may be used to acquire, generate, process, decode, transfer, store, and/or log digital signals to support a number of devices for example:

A cellular phone device (2214) may be used to enable telecommunications.

A microphone input device (2215) may be used to acquire sounds such as spoken language from a microphone (2221) for use with the cellular phone device (2214) as well as for the spoken language interface used for general computing tasks.

A speaker device (2216) may be used to transmit sounds such as spoken language and/or music to a speaker (2222) for use with the cellular phone device (2214) as well as for the spoken language interface used for general computing tasks.

A video output device (2217) may be used to format and transmit information to a visual information display (2223) such as a wearable graphic display and/or a cathode ray tube (CRT) device.

A printable output device (2218) may be used to format and transmit information to a printer (1824), plotter and/or other external device.

A biometric authentication device (2219) may be used to acquire biometric information such as fingerprints from a biometric reader (2225) for use in authentication and access control.

An input and output expansion adaptor (2220) may be used to permit attachment to the device of other external devices such as still and/or video cameras, global positioning systems, scanners (2226), infrared transmitters, Bluetooth standard interfaces or other devices that physically and/or logically connect external devices to the appliance device.

As a general purpose and/or specialized computing services device, the knowledge appliance may serve in multiple roles, just as currently available personal digital assistant (PDA) devices serve in multiple roles. For example, the appliance may be used as a personal organizer with calendar, task list, personal memos and/or phone list. The appliance may also be used as a wired and/or wireless telephone and/or answering machine. In cases where a cellular phone device (2214) uses standard and/or broadband wireless communication, the appliance may also be used to connect to the Internet, world-wide web and/or other information networks, such as a corporate information network. The authentication capabilities, which could include voiceprint and/or fingerprint authentication, would enable secure access to information sources including confidential information sources.

In some embodiments, the packaging for this device may be very compact, making it easy for a person to carry it anywhere. Examples of configurations of the compact packaging include wearable devices that fit into an item of clothing and/or jewelry such as a shirt or bracelet. The proliferation of personal electronic devices has introduced much duplication in underutilized device components. As an example, the digital signal processor needed for a cellular phone and/or for a music player may be used for other purposes. The digital signal processor (2213) in the knowledge appliance may singly replace the digital signal processor in multiple personal electronic devices.

In one embodiment of the invention, reconfigurable computing devices such as field programmable gate arrays (FPGAs) may be used as the processors (2204, 2205, 2206) and/or as other components such as the digital signal processor (2213).

Figure 23:
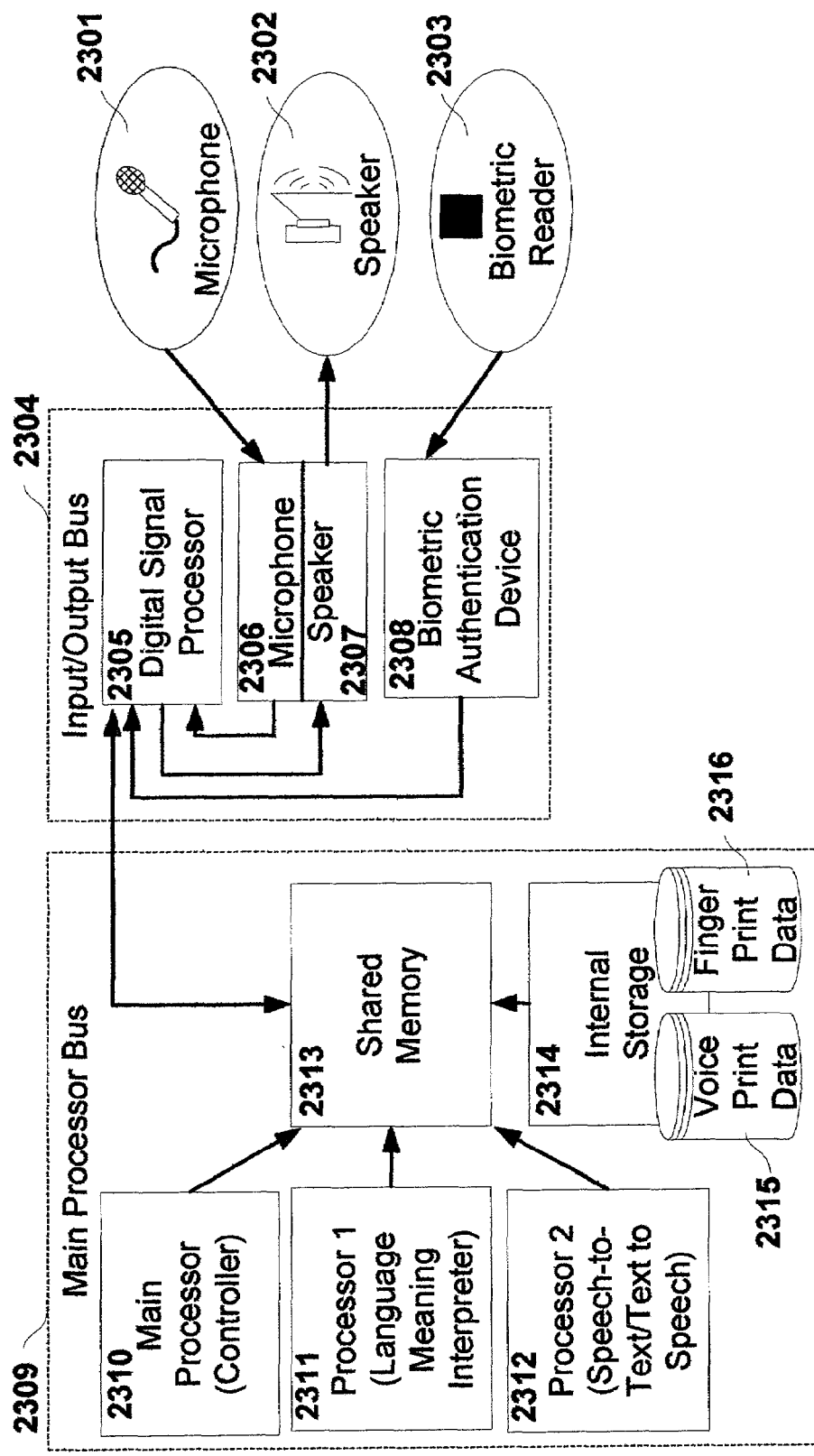
FIG. 23 is a schematic view of a process flow of the knowledge appliance device of FIG. 22.

FIG. 23 shows how a knowledge appliance device (FIG. 22) may process a sample flow of steps. Given input from a microphone (2301), the device may receive the signal (2306) and process it using a digital signal processor (2304). The signal could then be placed in shared memory (2313) where a Speech-to-text processor (2312) may convert the signal into text. A meaning interpreter (2311) may then process the text to interpret the meaning. If there is ambiguity requiring clarifying questions and/or other reason to provide spoken feedback or response to a user, the meaning interpreter (2311) could generate the text of the question and/or response, the text-to-speech processor (2312) could convert the text to an audio signal representing speech and send it to shared memory (2313) where the digital signal processor (2305) could get it and send it to the speaker output (2307) for reproduction in the speaker (2302).

In cases where biometric authentication is required, a biometric reader (2303) could receive input such as the press of a finger, send the input to the biometric authentication device (2308) for processing by the digital signal processor (2305), placement in shared memory (2313) and interpretation by the main processor (2310). The main processor could compare the input with data in internal storage (2314) such as voice print data (2315) and/or fingerprint data (2316), before permitting access to sensitive information.

Examples of functions of the knowledge appliance device may include:
Interpret spoken language commands
Perform actions requested in spoken language commands
Clarify meaning of spoken language commands
Place knowledge in the knowledge network,
Manage knowledge that previously existed in the knowledge network,
Extract knowledge from the knowledge network, and
Perform manipulations and analyses of extracted knowledge to
Control external devices
Exchange information with external devices
Provide intelligent unified messaging services Simulated Consciousness Most of the activity in the brain occurs at an unconscious level without bubbling up to our consciousness. This is because the voltages are so small and the network so large that there is no way the conscious mind can track the flow of impulses. This flow appears chaotic when examined with the most sensitive instruments currently in existence, but brain activity yields results because humans are able to recognize, generalize, infer, and make decisions, and even remember things that occur in the brain during subconscious states such as remembering a dream after awakening.

A phenomenon that helps resolve this chaos into choate thoughts is the "hot spot". A cluster of neurons becomes all fired up and triggers responses in the brain that constitute recognition, association, generalization, and resolve. The electrically excited cluster of neurons is the hot spot, and imaging techniques such as CAT scans and magnetic resonance imaging can graphically portray cognition distinguishing regions of the brain that are stimulated from other regions that are not. When a spot gets hot enough, the brain activity becomes noticeable by human consciousness. At that moment, there is a transition from underlying, seemingly chaotic, unconscious brain activity to meaningful, recognizable, conscious cognitive events. This transition characterizes emergence.

Though the exact mechanisms of consciousness in humans are still poorly understood, this invention seeks to imitate both the results and the behavior that leads to the results. By maintaining a contextual store of information upon which to base expectations, the multi-dimensional interpreter is continually prepared to wake up to a familiar reality and process inputs in that context.

Embodiments of the present invention utilizing this type of simulation, besides simulating the brain's ability to interpret complex spoken and written language, has mechanisms and methods of simulating consciousness. The features of consciousness this system may simulate include, but are not limited to, the following:

Perception—By receiving and interpreting audio (2221) and video signals (2227), correlating the information and providing a basis to act upon the perceived information, the knowledge appliance exhibits the conscious behavior of perception.

Cognition—By interpreting incoming signals the knowledge appliance exhibits the conscious behavior of cognition.

Self-Awareness—By possessing a set of attributes that describe a name and a set of functions the appliance is capable of performing, and another set of functions that other entities, including a user, are capable of performing, the appliance becomes aware of its capabilities in relation to other objects in the real-world.

Prediction—By receiving, tracking and correlating information about the progress of time from a "system clock" and about its own current location from a global positioning system or similar device, the appliance can predict when events are about to occur. Readily available information from calendars and mapping systems can make it possible for the device to track and perform reasoning processes about its position and/or, by extension, its users position in space and time. thus In a distributed knowledge system in which each fragment of knowledge can be considered a proposition, the truth, falsehood and applicability of a proposition can be determined during the course of processing real-world knowledge. Presuming that the domain or context of the knowledge proposition can be determined to match that of the real-world knowledge being processed, the weight of the proposition may be adjusted based on the determined truth, falsehood or applicability. The weight of a proposition can be used as its confidence value for stochastic or fuzzy processing, and adjusting weights in an automated system is analogous to cognitive learning in a biological organism.

Other Embodiments of the Invention

While the invention has been described with reference to a preferred embodiment wherein the knowledge network is a Bayesian style network, the invention may be implemented in a different manner using models other than Bayesian networks, such as conceptual schema, semantic networks or Markov models, for example. The invention is not confined to any single model type and may be carried out using any suitable stochastic model.

Furthermore, while the invention has been described in detail with reference to preferred embodiments, it is understood that variations and modifications thereof may be made without departing from the true spirit and scope of the invention.

That which is claimed is:

1. A method of deducing the meaning of a sentence or phrase comprising the steps of:
    A) forming, a priori, a set of propositions each comprising at least an x, y, r and c object wherein x is a first object, y is a second object, r is a relationship between the first and second objects and c is a context of the relationship between the first and second objects;
    B) assigning, a priori, a weight to each proposition formed in step A to represent a confidence value of the validity of such proposition as compared to other propositions with the same first object;
    C) retrieving, upon receiving input of the sentence or phrase, applicable propositions by matching each word in the sentence or phrase to all propositions with the same first object;
    D) modifying the a priori weight of the propositions retrieved in step C by applying applicable heuristics through one or more of the steps of:
        1) applying heuristics to analyze the morphology of each word in a sentence or phrase to identify if a prefix or suffix has been added to a root word that may impact the meaning of the root word;
        2) applying semantic heuristics to the sentence or phrase to create a hierarchy of statistically likely semantic roles;
        3) applying syntax heuristics to the sentence or phrase to create a hierarchy of statistically likely semantic roles;
        4) applying context heuristics to the "c" objects of all applicable propositions of step C to create a hierarchy of statistically probable contexts of the sentence or phrase;
    E) applying the modified weights to the applicable propositions; and
    F) selecting the propositions with the highest modified weights;
    whereby the meaning of a phrase or sentence and its constituent words is deduced.

* * * * *